(12) United States Patent
Zahn

(10) Patent No.: US 8,465,249 B2
(45) Date of Patent: Jun. 18, 2013

(54) METHOD AND APPARATUS FOR STACKING SHEET MATERIALS

(76) Inventor: Lloyd P. Zahn, New Brighton, PA (US)

( * ) Notice: Subject to any disclaimer, the term of this patent is extended or adjusted under 35 U.S.C. 154(b) by 0 days.

(21) Appl. No.: 13/031,492

(22) Filed: Feb. 21, 2011

(65) Prior Publication Data

US 2011/0142588 A1    Jun. 16, 2011

Related U.S. Application Data

(62) Division of application No. 12/130,272, filed on May 30, 2008, now abandoned.

(51) Int. Cl.
*B65G 49/05* (2006.01)

(52) U.S. Cl.
USPC ............ 414/793.4; 414/794.2; 414/927; 414/799; 271/192

(58) Field of Classification Search
USPC ............ 271/192; 414/789.9, 790, 790.6, 414/790.8, 791.1, 792.7, 793.1, 793.4, 793.5, 414/793.6, 793.7, 794, 794.2, 794.8, 799, 414/927, 928, 789.5, 929
See application file for complete search history.

(56) References Cited

U.S. PATENT DOCUMENTS

| | | | | |
|---|---|---|---|---|
| 1,727,209 A | * | 9/1929 | Lentz | 414/794 |
| 2,273,689 A | * | 2/1942 | Boron et al. | 271/192 |
| 2,320,094 A | * | 5/1943 | Nash | 414/788.8 |
| 2,562,247 A | * | 7/1951 | Van Schie | 83/157 |
| 2,772,612 A | * | 12/1956 | Feick et al. | 414/790.3 |
| 3,381,829 A | * | 5/1968 | Turner | 414/793.9 |
| 3,402,830 A | * | 9/1968 | Copping et al. | 414/794.1 |
| 3,844,422 A | * | 10/1974 | Smith et al. | 414/789.9 |
| 3,954,190 A | * | 5/1976 | Howard et al. | 414/790 |
| 4,058,225 A | * | 11/1977 | Janson | 414/793.4 |
| 4,269,556 A | * | 5/1981 | Martini | 414/790.8 |
| 4,298,633 A | | 11/1981 | Bradlee | |
| 4,426,184 A | * | 1/1984 | Boyland | 414/793.4 |

(Continued)

FOREIGN PATENT DOCUMENTS

| | | |
|---|---|---|
| DE | 10102929 A1 | 8/2002 |
| JP | 01034817 A | 2/1989 |
| WO | WO 02/92485 A1 | 11/2002 |

OTHER PUBLICATIONS

International Search Report for Application No. PCT/US2008/071021 mailed Mar. 26, 2009.

(Continued)

*Primary Examiner* — Gregory Adams
(74) *Attorney, Agent, or Firm* — Alan J. Ross

(57) ABSTRACT

A sheet stacking and pallet loading system configured to stack sheets of material on a first pallet while holding a second pallet in a staging position above the first pallet. The system can include an elevator for supporting the first pallet in a loading position while the sheets are stacked on the first pallet. After a sufficient quantity of sheets has been stacked thereon, the elevator can lower the first pallet from its loading position. The second pallet can then be lowered from its staging position such that the sheets can be stacked thereon. The system can further include extendable pallet supports which can be extended to support the second pallet while the first pallet is being lowered by the elevator. The pallet loading system can further include a pallet-grasping assembly having, first, a frame movable along a track and, second, one or more end-effectors movable relative to the frame for engaging a pallet.

11 Claims, 37 Drawing Sheets

PALLET ELEVATOR UP

U.S. PATENT DOCUMENTS

| | | |
|---|---|---|
| 4,479,673 A | 10/1984 | Inaba et al. |
| 4,521,462 A | 6/1985 | Smythe |
| 4,542,860 A | 9/1985 | Hecht et al. |
| 4,553,713 A | 11/1985 | Hecht et al. |
| 4,564,429 A | 1/1986 | Depiereux |
| 4,587,822 A | 5/1986 | Bradlee |
| 4,604,810 A | 8/1986 | Gusching et al. |
| 4,614,101 A | 9/1986 | Fornataro |
| 4,616,971 A | 10/1986 | Matrone |
| 4,635,458 A | 1/1987 | Bradlee |
| 4,658,715 A * | 4/1987 | Stobb ................... 100/2 |
| 4,685,714 A | 8/1987 | Hoke |
| 4,687,822 A | 8/1987 | Eguchi et al. |
| 4,732,727 A | 3/1988 | Havens |
| 4,732,777 A | 3/1988 | Smythe |
| 4,736,512 A | 4/1988 | Gusching et al. |
| 4,765,169 A | 8/1988 | Bradlee |
| 4,794,773 A | 1/1989 | Bradlee |
| 4,801,102 A | 1/1989 | Bradlee |
| 4,827,801 A | 5/1989 | Gusching |
| 4,828,276 A | 5/1989 | Link et al. |
| 4,830,872 A | 5/1989 | Grenfell |
| 4,856,153 A | 8/1989 | Gusching |
| 4,866,824 A | 9/1989 | Falk et al. |
| 5,007,151 A | 4/1991 | Gusching |
| 5,033,340 A | 7/1991 | Siefring |
| 5,088,182 A | 2/1992 | Wagner et al. |
| 5,127,695 A | 7/1992 | Zoeten |
| 5,150,937 A | 9/1992 | Yakou |
| 5,161,847 A | 11/1992 | Yakou |
| 5,255,549 A | 10/1993 | Williams |
| 5,269,379 A * | 12/1993 | Millar et al. ................... 172/19 |
| 5,373,766 A | 12/1994 | Ranly et al. |
| 5,421,535 A | 6/1995 | Hemmert et al. |
| 6,032,436 A | 3/2000 | Hart et al. |
| 6,048,166 A | 4/2000 | Stingel et al. |
| 6,086,063 A * | 7/2000 | Esenther ................... 271/194 |
| 6,273,483 B1 | 8/2001 | Bone |
| 6,338,607 B1 * | 1/2002 | Vincent et al. ............ 414/796.5 |
| 6,393,694 B2 | 5/2002 | Roovers |
| 6,637,997 B2 | 10/2003 | Ahrns et al. |
| 6,786,144 B2 | 9/2004 | Williams |
| 7,134,372 B2 | 11/2006 | Flaherty et al. |
| 7,383,711 B2 | 6/2008 | McKenna |
| 2005/0229762 A1 | 10/2005 | Flaherty et al. |
| 2007/0101846 A1 | 5/2007 | Zahn |
| 2009/0297323 A1 | 12/2009 | Zahn |

OTHER PUBLICATIONS

Written Opinion of the International Searching Authority for Application No. PCT/US2008/071021 mailed Mar. 26, 2009.
U.S. Appl. No. 13/166,687, filed Jun. 22, 2011 (110135).

* cited by examiner

METHOD AND APPARATUS FOR STACKING SHEET MATERIALS

CROSS-REFERENCE TO RELATED APPLICATIONS

This non-provisional patent application is a divisional patent application of U.S. patent application Ser. No. 12/130,272, filed May 30, 2008, Publication No. US 2009/0297323 A1, the disclosure of which is herein incorporated by reference in its entirety.

BACKGROUND

1. Field of the Invention

The present invention generally relates to stacking sheets of material on a pallet, for example, and, in addition, to exchanging pallets once a sufficient, or predetermined, quantity of sheets has been stacked on the pallet.

2. Description of the Relevant Art

Many materials produced by strip mills, including sheet metal, for example, are typically sold in large, coiled rolls. Those purchasing these large, coiled rolls and desiring to manufacture various products from the sheet metal, for example, often find it necessary to have the sheet metal slit into narrow strips on a slitting line and/or otherwise cut to width. In various circumstances, as a result, the sheet metal is slit longitudinally along the length thereof to sizes suitable for particular products and/or stamping processes, for example. Various exemplary devices and methods for slitting material and/or cutting materials to width are disclosed in U.S. Pat. No. 4,298,633, entitled "METHOD AND APPARATUS FOR TENSIONING METALLIC STRIPS ON A SLITTING LINE", which issued on Nov. 3, 1981; U.S. Pat. No. 4,614,101, entitled "METHOD OF REWINDING SLIT METAL STRANDS", which issued on Sep. 30, 1986; U.S. Pat. No. 5,373,766, entitled "SLITTER KNIFE HOLDER", which issued on Dec. 20, 1994; U.S. Pat. No. 5,421,535, entitled "METHOD AND APPARATUS FOR AUTOMATICALLY WINDING SCRAP METALLIC STRIP METAL", which issued on Jun. 6, 1995; U.S. Pat. No. 7,134,372, entitled "CNC SLITTER MACHINE", which issued on Nov. 14, 2006, and U.S. patent application Ser. No. 11/268,004, entitled "COMPENSATING STRIPPER RINGS FOR MATERIAL SLITTING MACHINES", which was filed on Nov. 7, 2005, the entire disclosures of which are incorporated by reference herein. Other exemplary slitters include HERR-VOSS® STAMCO® STRAND EXTENSIONER® and "Compu-Cut"™ machines available from the Herr-Voss Stamco Company in Callery, Pa.

Further to the above, there are a variety of shape defects that may arise in flat rolled materials, especially in metal materials, for example. Mill induced defects in metal materials can include, for example, wavy edges, center buckles, quarter buckles, crossbow, and coil set. Such shape defects may be caused by misaligned rolls or other substandard equipment or manufacturing processes that can be found in an array of processing lines. Regrettably, material related shape problems result in inefficient operations at downstream processing plants, and material variability or inconsistency can cause production delays, customer dissatisfaction, and many other problems and potential costs. In view of the above, levelers have been developed to reduce such defects and problems and can be employed before the material has been wound into a coiled roll and/or after the material has been unwound from the roll. Various exemplary devices and methods of leveling material are disclosed in U.S. Pat. No. 4,635,458, entitled "LEVELING APPARATUS", which issued on Jan. 13, 1987; U.S. Pat. No. 4,587,822, entitled "TENSION LEVELING APPARATUS", which issued on May 13, 1986; U.S. Pat. No. 4,765,169, entitled "METHOD OF TENSION LEVELING NONHOMOGENEOUS METAL SHEET", which issued on Aug. 23, 1988; U.S. Pat. No. 5,255,549, entitled "TENSION LEVELER ROLL CLEANING SYSTEM AND METHOD", which issued on Oct. 26, 1993; and U.S. patent application Ser. No. 11/149,898, entitled "CNC LEVELER", which was filed on Jun. 10, 2005, the entire disclosures of which are incorporated by reference herein. Other exemplary levelers include HERR-VOSS® STAMCO® PRECISION LEVELER® machines available from the Herr-Voss Stamco Company in Callery, Pa.

Once the material has been unwound from their large, coiled rolls and sufficiently leveled and cut to width, if necessary, the material can be cut into sheets. In various circumstances, sheet metal, for example, can be fed into a shear, or cut-to-length line, and cut lattitudinally in order to cut the sheet metal to length. Depending on various parameters such as the speed of the line, the length of the sheets, and the thickness of the material, for example, a shear may often comprise a down cut shear, a rotary shear, and/or a hydraulic shear. Exemplary cut-to-length processing lines are available from the Hen-Voss Stamco Company in Callery, Pa. Once cut to length, the sheets can be stacked onto a pallet and, after a sufficient, or predetermined, quantity of sheets has been stacked on the pallet, the finished pallet can be removed from the processing line. In many circumstances, though, it is the removal of the finished, stacked pallet and the placement of an empty pallet that causes interruptions in the processing of the material. What is needed is a sheet stacking device which can decrease and/or eliminate such interruptions.

SUMMARY

In at least one form, a sheet stacking and pallet loading system can be configured to stack sheets of a material on a first pallet, for example, while holding a second pallet, for example, in a staging position above the first pallet. In various embodiments, the system can include an elevator for supporting the first pallet in a loading position while sheets of material are stacked on the first pallet and, after a sufficient, or predetermined, quantity of sheets have been stacked thereon, the elevator can lower the first pallet from its loading position.

In various embodiments, the second pallet can be lowered from its staging position into a loading position such that sheets of material can be stacked on the second pallet. In at least one embodiment, the system can further include extendable pallet supports which can be extended to support the second pallet in the loading position. In certain circumstances, the second pallet support can be lowered onto the extendable pallet supports while the first pallet is being lowered by and/or removed from the elevator. The elevator can then be repositioned underneath the second pallet and the extendable pallet supports can be retracted such that the second pallet can be supported by the elevator. Similar to the above, a third pallet, for example, can be held above the second pallet while sheets of material are stacked on the second pallet such that the pallet exchange process can be repeated once again.

In various embodiments, the pallet loading system can be configured to grab, or grasp, a pallet and move it into a staging position. In at least one embodiment, the pallet loading system can include a track defining a path and a frame movable along the path. In at least one such embodiment, the pallet loading system can further comprise at least one pallet-engaging assembly movably mounted to the frame which can be configured to engage the pallet. In certain embodiments, a first pallet engaging assembly can be moved relative to the frame to engage a pallet in a first direction, a second pallet-engaging assembly can be moved relative to the frame to engage the pallet in a second direction, and a third pallet-engaging assembly can be moved relative to the frame to engage the pallet in a third direction, wherein the first, second, and third directions can be different. In at least one such embodiment, the first, second, and third directions can define a plane for holding the pallet.

This Summary is intended to briefly outline certain embodiments of the subject application. It should be understood that the subject application is not limited to the embodiments disclosed in this Summary, and is intended to cover modifications that are within its spirit and scope, as defined by the claims. It should be further understood that this Summary should not be read or construed in a manner that will act to narrow the scope of the claims.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, in one form, and such exemplifications are not to be construed as limiting the scope of the invention in any manner.

DETAILED DESCRIPTION

Figure 1:
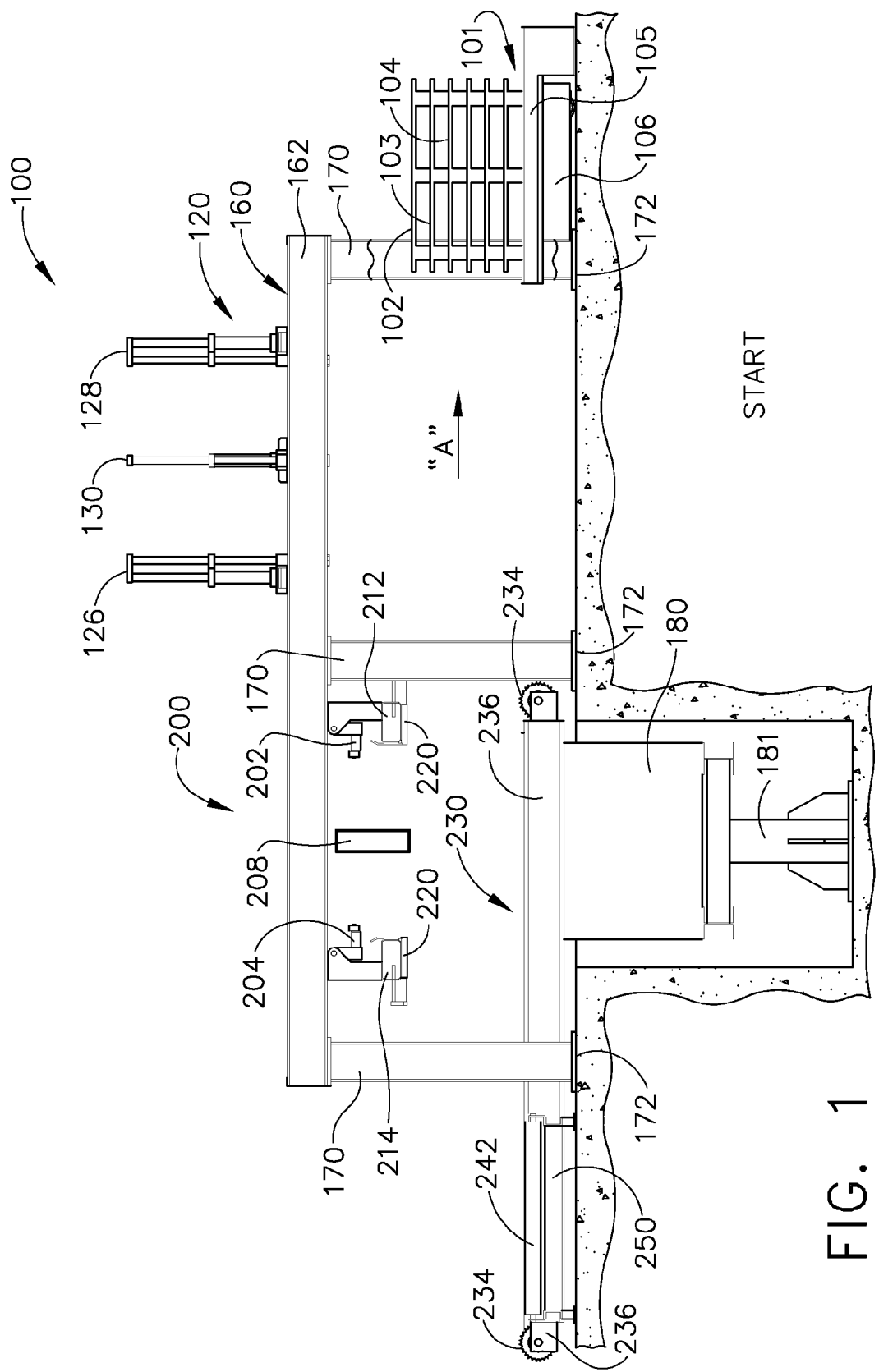
FIG. 1 is an elevational view of a sheet stacking and pallet loading system in accordance with at least one embodiment of the present invention illustrating a pallet car positioned underneath a stack of pallets which are supported by pallet support members.

Certain exemplary embodiments will now be described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments and that the scope of the various embodiments of the present invention is defined solely by the claims. The features illustrated or described in connection with one exemplary embodiment may be combined with the features of other embodiments. Such modifications and variations are intended to be included within the scope of the present invention.

In various circumstances, the sheets of material produced by a cut-to-length processing line, for example, may be stacked on a pallet, for example, before the sheets of material are transported to a downstream manufacturing process, line, and/or plant. In various circumstances, the sheets of material exiting a cut-to-length line can be fed directly into a sheet stacking system. In other circumstances, the sheets of material may be indirectly fed into a sheet stacking system by being held in a staging area and/or be subjected to an intermediate process after exiting the cut-to-length line. In certain embodiments, a sheet stacking system in accordance with various embodiments of the present invention can include a cut-to-length line, or a portion of a cut-to-length line. In at least some embodiments, the sheet stacking system can include cut-to-width and/or leveler assemblies, for example. In any event, as outlined above and described in greater detail further below, a sheet stacking and pallet loading system in accordance with various embodiments of the present invention can be configured to stack sheets of a material on a first pallet, for example, while holding a second pallet, for example, in a staging position above the first pallet. Such systems can allow the first pallet to be quickly replaced with the second pallet after a sufficient, or predetermined, quantity of sheets have been stacked on the first pallet. In at least one such embodiment, the first pallet can be lowered such that it can be unloaded from the sheet stacking system while the second pallet can be lowered to replace the first pallet with little, or no, interruption to the overall process of stacking sheets of material on a pallet. Such a sheet stacking system can facilitate a more efficient and profitable process, especially when used in conjunction with contemporaneously operating, and/or integral, cut-to-length, leveling, and/or cut-to-width processing lines. Similar to the above, a third pallet can be held in a staging position above the second pallet as sheets of material are being stacked on the second pallet, whereby the cycle of replacing full, or at least partially full, pallets with empty pallets can be repeated.

Figure 2:
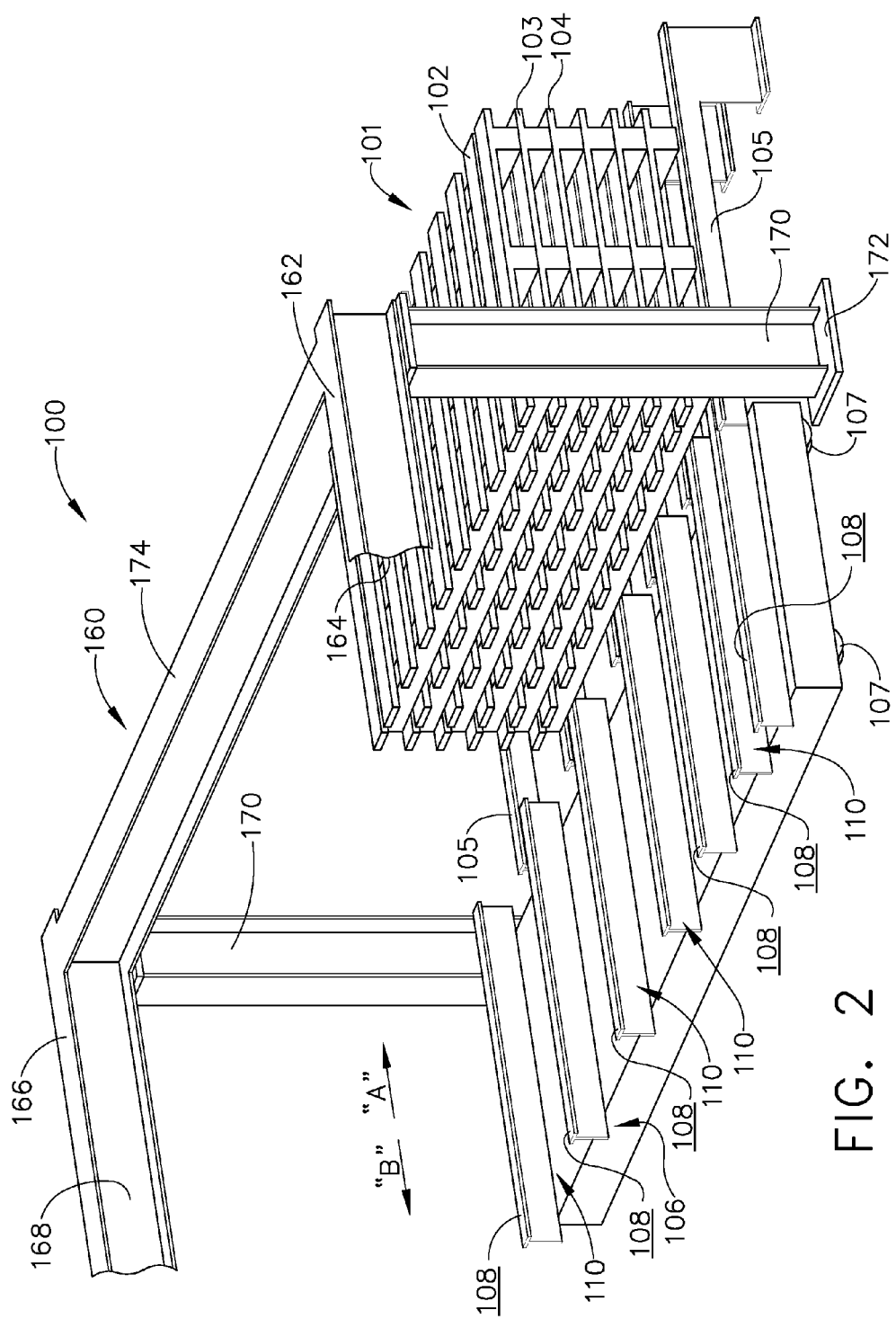
FIG. 2 is a perspective view of the pallet car and the pallet support members of the system of FIG. 1.
Figure 3:
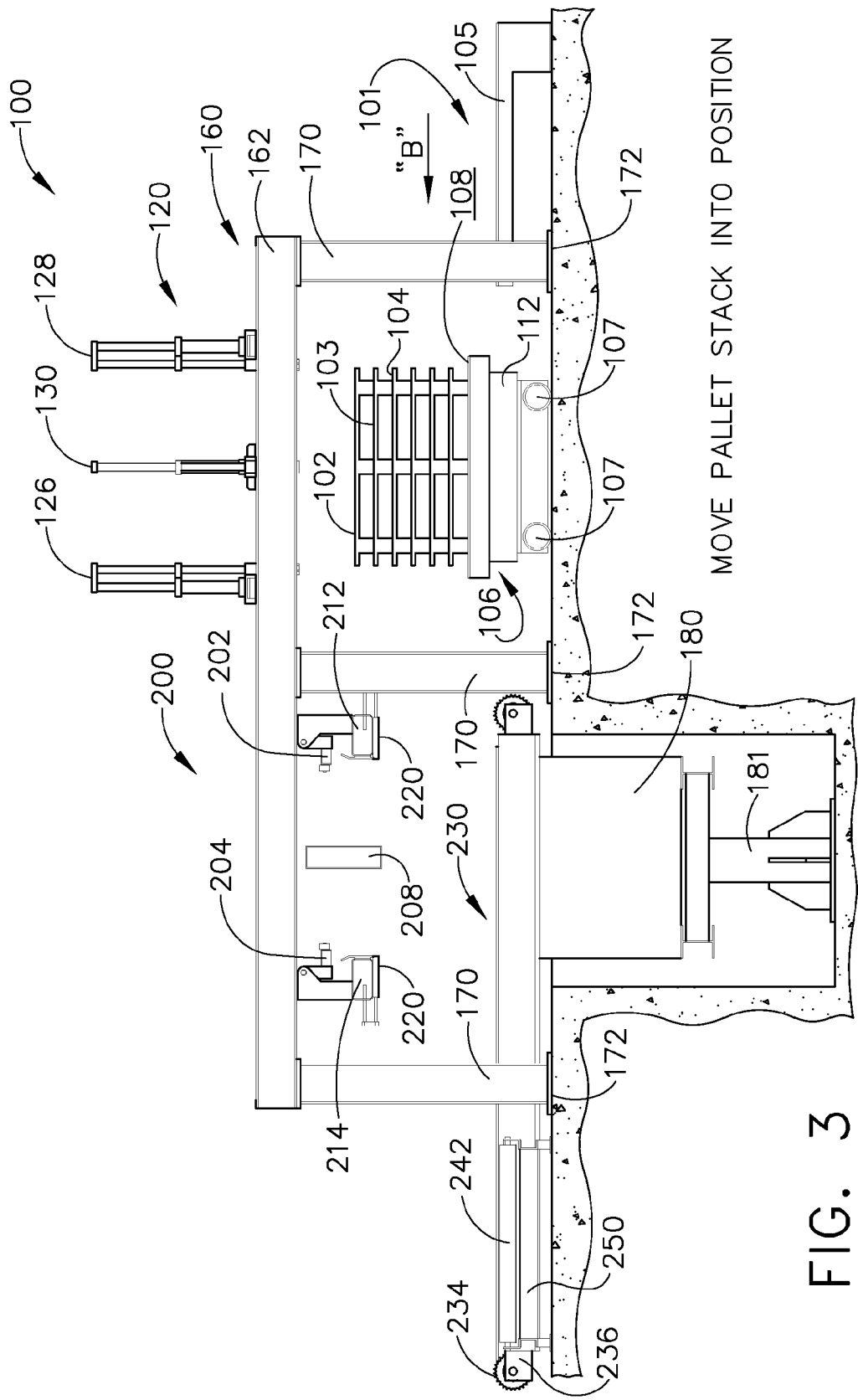
FIG. 3 is an elevational view of the system of FIG. 1 illustrating the stack of pallets being moved by the pallet car.

In various embodiments, a sheet stacking and pallet loading system in accordance with various embodiments of the present invention, such as system 100 (FIG. 1), for example, can include a pallet loading system configured to obtain one or more pallets from a pallet pick-up area, such as pick-up point 101, for example, and deliver the pallet or pallets to a sheet stacking system. In at least one embodiment, the pallet loading system can include one or more support cantilevers 105 for supporting one or more pallets, such as pallets 102, 103, and 104, for example, and a pallet car 106 for transporting the pallets from support cantilevers 105 to a position in which pallet-grasping system 120 can remove a pallet from car 106 as described in greater detail below. In certain embodiments, car 106 can include a propulsion and/or steering system which can permit car 106 to move toward cantilevers 105 in direction A, for example. As illustrated in FIG. 3, car 106 can include wheels 107 which can drive and/or steer car 106. In various embodiments, car 106 can be configured such that it can be positioned underneath cantilevers 105 and lift the pallets upwardly off of, or at least nearly off of, cantilevers 105. In at least one embodiment, car 106 can include support surface 108 and, in addition, an elevator 112, such as a hydraulic cylinder and piston assembly and/or a scissors hoist, for example, which can be configured to move support surface 108 upwardly into contact with the pallets. In certain embodiments, referring to FIG. 2, support surface 108 can include channels, or slots, 110 which can be configured to receive and provide clearance for cantilevers 105, or at least the distal ends of cantilevers 105, when car 106 is positioned underneath cantilevers 105. In such embodiments, the channels 110 can be sufficiently deep so as to allow support surface 108 to be moved upwardly relative to cantilevers 105. Once the pallets have been sufficiently lifted off of cantilevers 105 by support surface 108, car 106 can move away from cantilevers 105 in direction B, for example, and remove the pallets from pallet pickup point 101.

Figure 4:
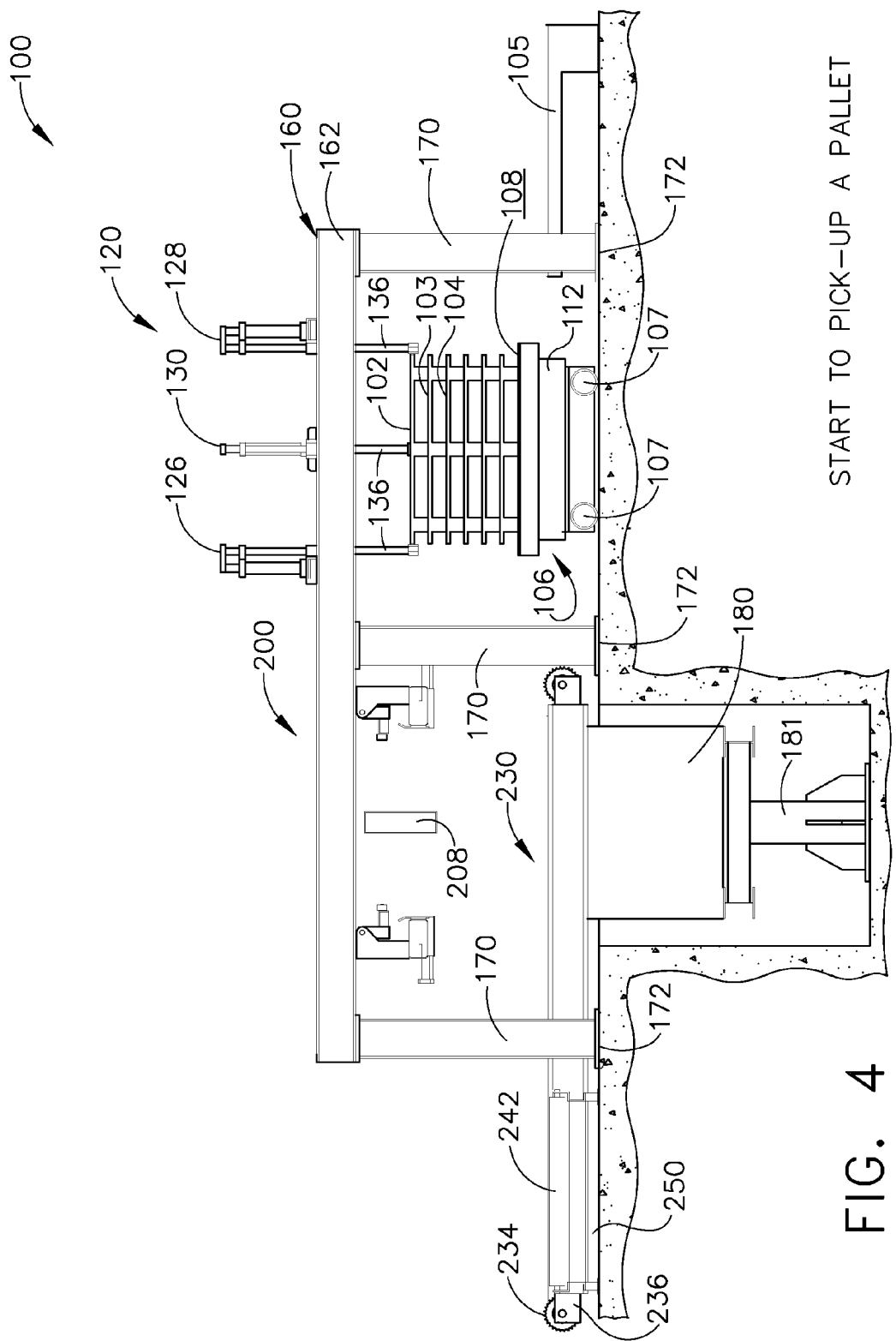
FIG. 4 is an elevational view of the system of FIG. 1 illustrating a pallet grasping assembly engaged with a first pallet on the pallet car.
Figure 5:
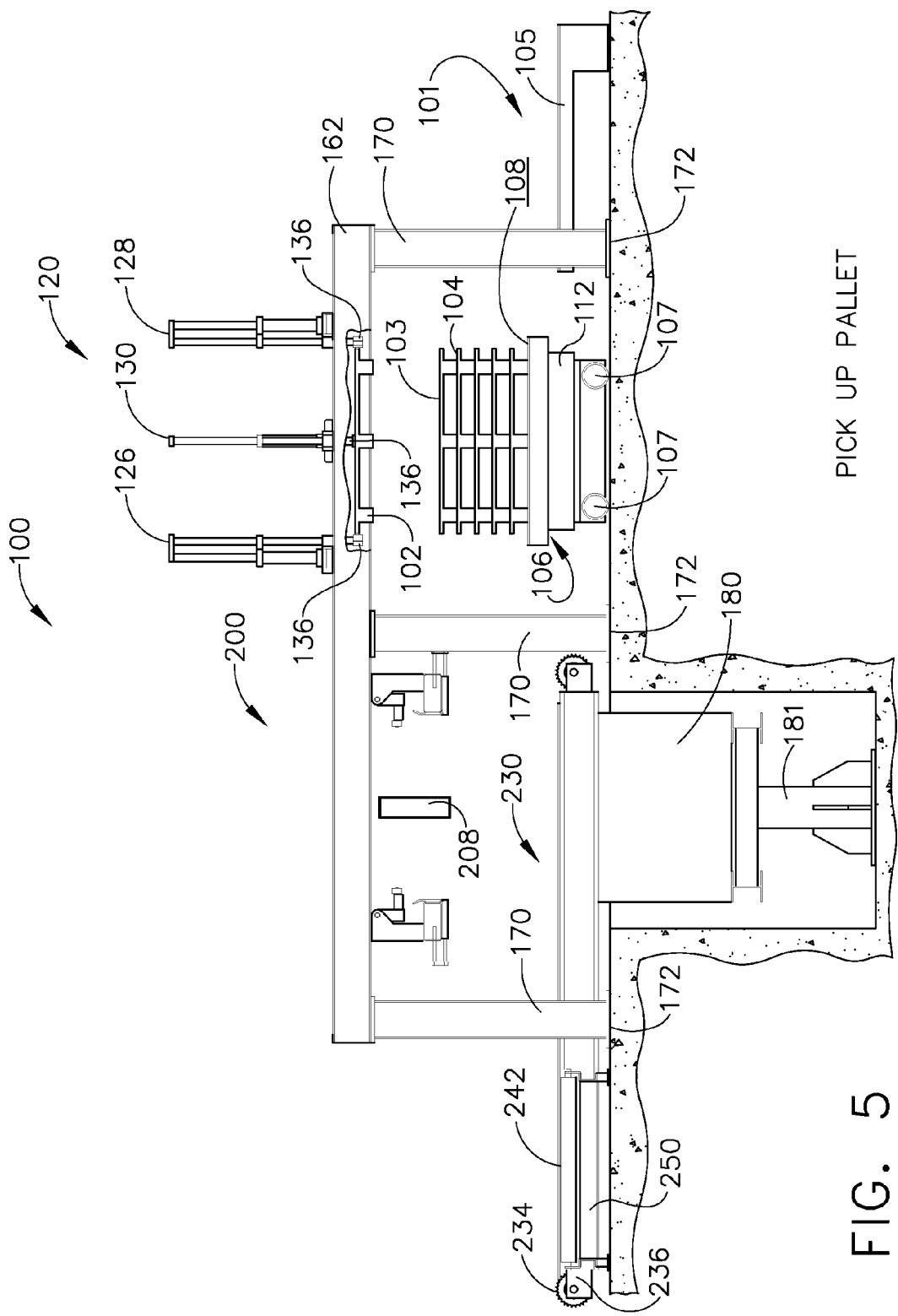
FIG. 5 is an elevational view of the system of FIG. 1 illustrating the pallet grasping assembly of FIG. 4 lifting the first pallet off of the pallet car.
Figure 15:
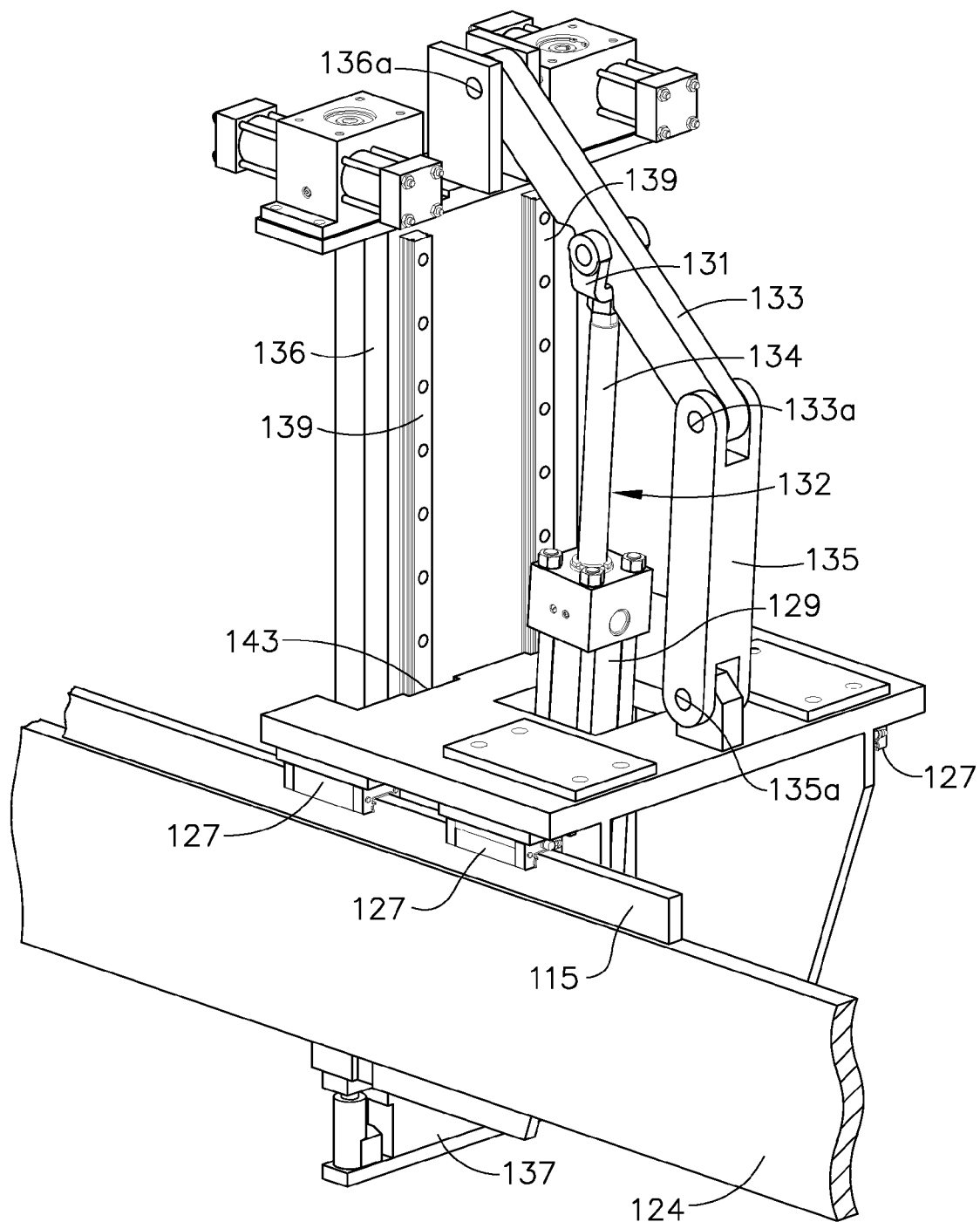
FIG. 15 is another perspective view of the actuator assembly of FIG. 12 illustrated in a retracted configuration.
Figure 16:
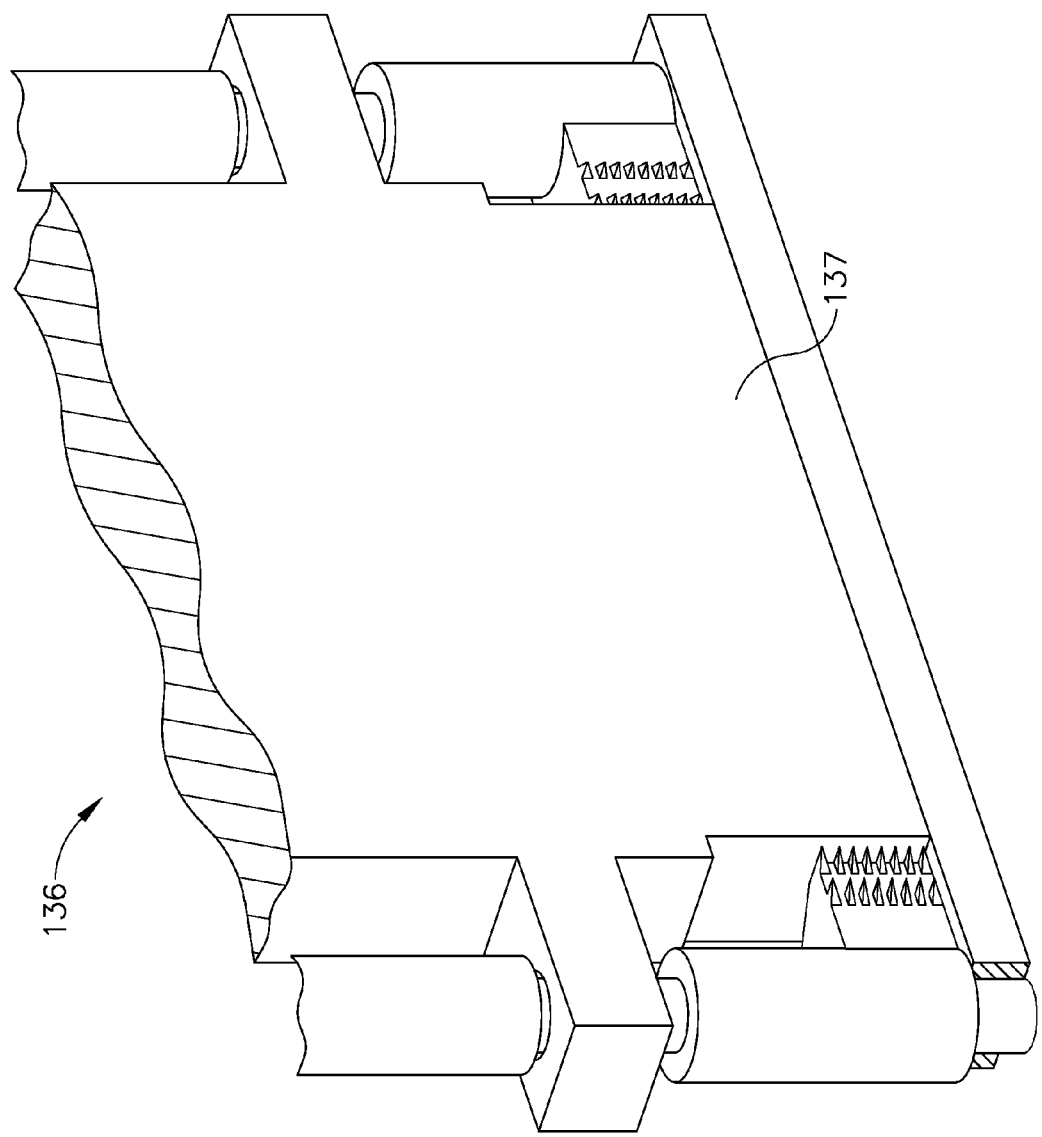
FIG. 16 is a detail view of a distal portion of the end-effector of the actuator assembly of FIG. 12.

In various embodiments, pallet grasping assembly 120 can be utilized to grasp a pallet on car 106, lift the pallet upwardly, and/or move the pallet to a pallet staging, or delivery, position as described in greater detail further below. In the exemplary embodiment illustrated in FIGS. 4 and 5, for example, the pallet grasping assembly 120 can be configured to grasp one pallet at a time, although alternative embodiments are envisioned in which a pallet grasping assembly can be configured to grasp more than one pallet at a time. In any event, referring to FIGS. 6-11, pallet grasping system 120 can include frame 124 and one or more actuator assemblies which can be configured to co-operate with one another to grasp a pallet. In at least one embodiment, pallet grasping system 120 can include a first actuator assembly 126, a second actuator assembly 128, and a third actuator assembly 130 which can each include at least one end-effector for engaging a pallet and at least one actuator for positioning the end-effector. In at least one such embodiment, one or more of the actuator assemblies 126, 128, and 130 can be movably mounted to frame 124 such that one or more of the actuator assemblies 126, 128, and 130 can be slid toward and/or away from a pallet positioned on car 106, for example. Referring to FIGS. 6-9, first actuator assembly 126, for example, can be slidably mounted to frame 124 within first guide 140 such that first actuator assembly 126 can be slid along first path 146. In various embodiments, first guide 140 can include sidewalls 141 which can define the first path 146 for first actuator assembly 126. In at least the illustrated embodiment, sidewalls 141 can define substantially straight walls and path 146 can be at least partially defined by an axis. In certain embodiments, referring to FIG. 15, an actuator assembly can include one or more guide supports 127 which can be configured to slidably support the actuator assembly on one or more guide rails, such as guide rail 115, for example, which can extend from, and/or be mounted to, frame 124. In at least one embodiment, guide supports 127 and guide rails 115 can include co-operating dovetail features which can permit relative movement along guide rails 115 but limit transverse movement, or otherwise undesirable movement, therebetween.

Figure 8:
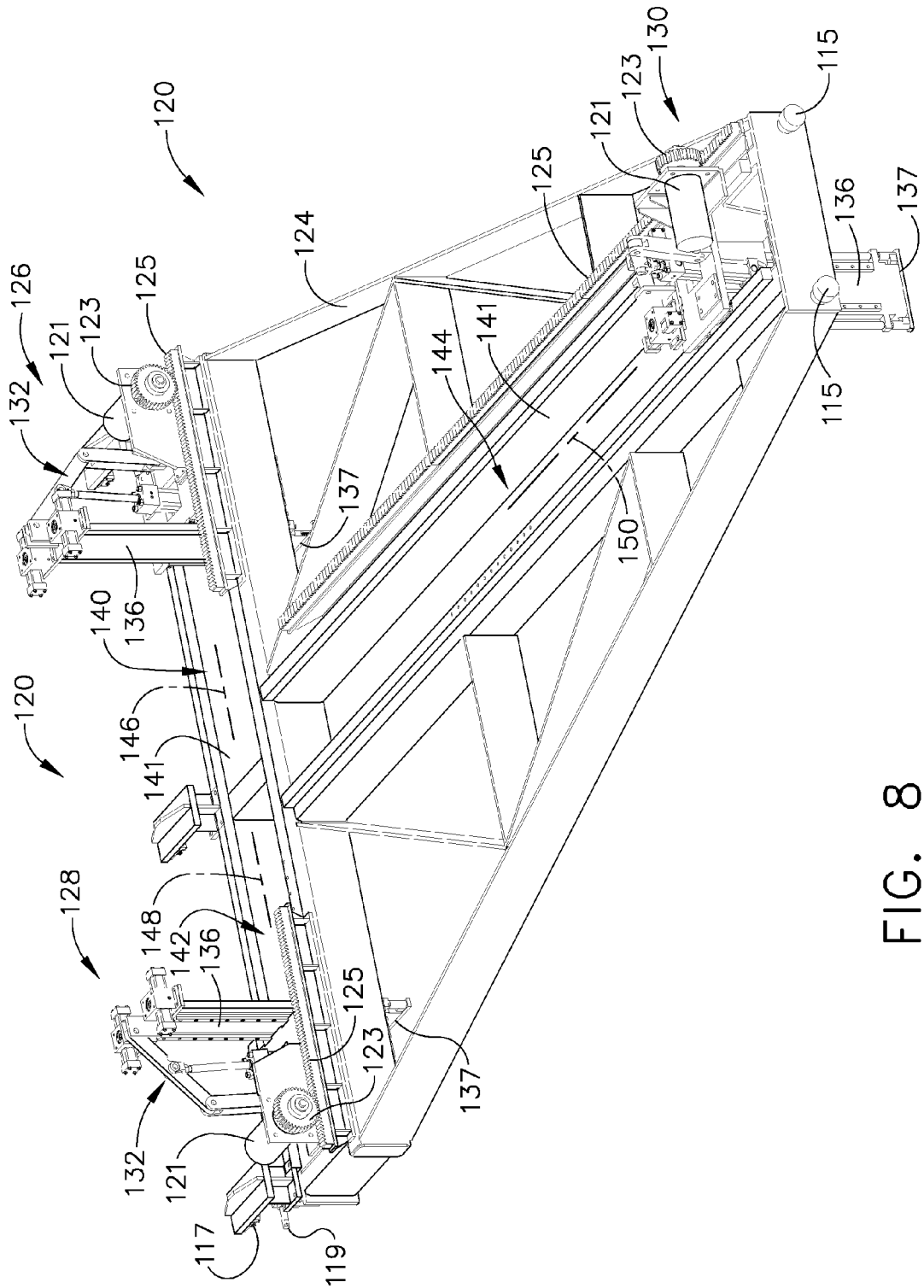
FIG. 8 is another perspective view of the pallet grasping assembly of FIG. 4.

In various embodiments, further to the above, first actuator assembly 126 can include any suitable means for moving first actuator assembly 126 relative to frame 124. In at least one embodiment, first actuator assembly 126 can include a motor and a drive wheel operably engaged with the motor. In at least one such embodiment, the drive wheel can be in contact with at least one of sidewalls 141 such that, when the drive wheel is rotated by the motor, the drive wheel can propel first actuator assembly 126 along first path 146. The direction in which first actuator assembly 126 is propelled, i.e., toward or away from the pallet, can depend on the direction in which the drive wheel is rotated. Other embodiments are envisioned in which a rack and pinion arrangement can be utilized to propel first actuator assembly 126. In at least one such embodiment, referring to FIG. 6, the first actuator assembly 126 can include a motor 121, such as a stepper motor, for example, which can be configured to rotate a gear 123, such as a pinion gear or spur gear, for example. Referring primarily to FIG. 8, gear 123 can be meshingly engaged with a toothed rack 125 mounted adjacent to, and/or mounted on, one or more of sidewalls 141 and/or any other suitable portion of frame 124. In use, motor 121 can rotate gear 123 such that, owing to the meshed engagement between the teeth of gear 123 and rack 125, the rotation of gear 123 may propel actuator assembly 126 along path 146 inwardly and/or outwardly depending on the direction in which gear 123 is rotated. Although rack 125 and path 146 are illustrated as having a linear, or at least substantially linear, arrangement, other embodiments are envisioned in which the rack and/or path include one or more curved portions and/or one or more linear portions. Furthermore, although not illustrated, other embodiments are envisioned which utilize chain drives and/or belt drives, for example, for moving one or more of the actuator assemblies relative to frame 124, for example.

Figure 6:
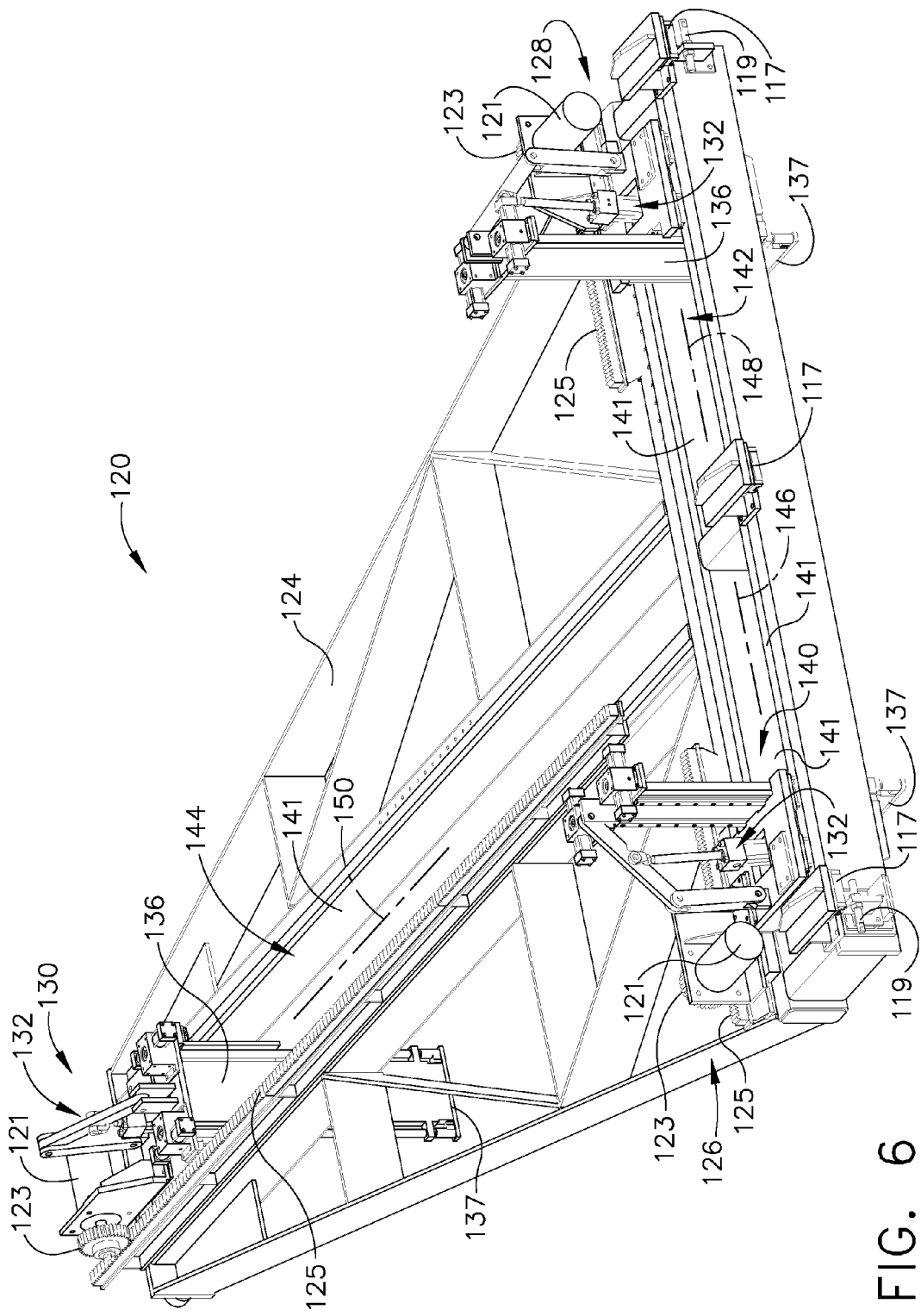
FIG. 6 is a perspective view of the pallet grasping assembly of FIG. 4 including three actuator assemblies configured for engaging a pallet.
Figure 7:
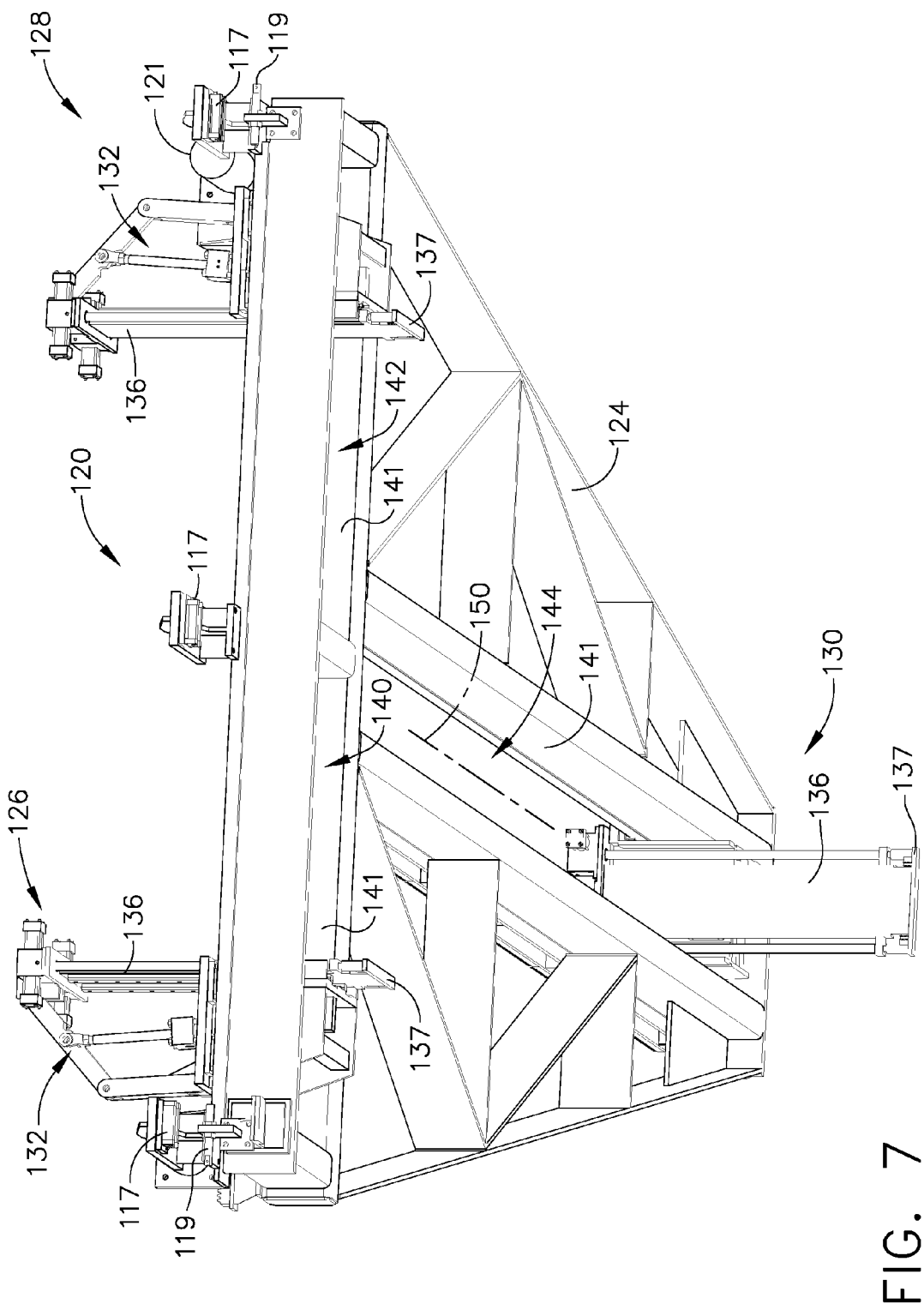
FIG. 7 is another perspective view of the pallet grasping assembly of FIG. 4 illustrating one of the actuator assemblies having an end-effector in an extended position and two of the actuator assemblies in retracted positions.

Similar to the above, frame 124 can further include second guide 142 and third guide 144 which can be configured to guide second actuator assembly 128 and third actuator assembly 130, respectively, when they are moved relative to frame 124. In various embodiments, second actuator assembly 128 can be slidably mounted to frame 124 within second guide 142 such that second actuator assembly 128 can be slid along second path 148 and, in addition, third actuator assembly 130 can be slidably mounted to frame 124 within third guide 144 such that third actuator assembly 130 can be slid along third path 150. Also similar to the above, actuator assemblies 128 and 130 can include any suitable means for moving the actuator assemblies 128 and 130 relative to frame 124 including means similar to those described in connection with first actuator assembly 126, for example. In any event, as outlined above, an actuator assembly can be movably or slidably mounted to frame 124, for example, such that the end-effector of the actuator assembly can be positioned against a pallet. Referring to FIGS. 6 and 7, first actuator assembly 126, for example, can include an actuator 132 and, in addition, an end-effector 136 having a pallet-contacting portion 137. Once the pallet-contacting portions 137 are in contact with a pallet, for example, the actuator assemblies can be configured to apply forces to the pallet via their respective end-effectors 136. In certain embodiments, such forces can be generated via the drive means, such as motor 121, gear 123, and rack 125, for example, and transmitted to the pallet through the end-effector 136. Other embodiments are envisioned in which the actuator assembly includes an additional system for generating a force and transmitting the force through the end-effector. In any event, the forces applied by the actuator assemblies can be sufficient such that the actuator assemblies can hold the pallet therebetween.

In various embodiments, further to the above, the end-effector 136 of the first actuator assembly 126 can be moved into engagement with a pallet in a first direction, the end-effector 136 of the second actuator assembly 128 can be moved into engagement with the pallet in a second direction, and the end-effector 136 of the third actuator assembly 130 can be moved into engagement with the pallet in a third direction. In at least one such embodiment, the first direction can be defined by first path 146, the second direction can be defined by second path 148, and the third direction can be defined by third path 150. In various embodiments, as a result of the above, the actuator assemblies of pallet grasping assembly 120 can engage the pallet in three different directions. In at least one such embodiment, the actuator assemblies can be configured to cooperate with one another to hold the pallet in a plane. In some embodiments, the directions in which the end-effectors engage the pallet can be triangulated, or otherwise arranged, in order to apply forces to the pallet such that the forces can have different vector components. In at least one embodiment, referring to FIG. 6, first actuator assembly 126 can be engaged with the pallet in a first direction along first path 146 which can be collinear or parallel, or at least substantially collinear or parallel, to a second direction in which second actuator assembly 128 can engage the pallet along second path 148. After the end-effectors 136 of actuator assemblies 126 and 128 contact the pallet, they can apply forces to the pallet which are in opposite, or at least substantially opposite, directions and thus apply forces in opposite, or at least substantially opposite, directions. Advantageously, further to the above, the pallet grasping assembly 120 can be configured to grasp a variety of pallets having different pallet widths, for example. By way of example, the end-effectors 136 may only have to be moved inwardly a short distance when a wide pallet is positioned therebetween as compared to a longer distance when a narrower pallet is positioned therebetween.

In various embodiments, further to the above, the end-effector 136 of third actuator assembly 130 can be engaged with the pallet in a direction along third path 150 which is perpendicular, or at least substantially perpendicular, to first path 146 and second path 148. In at least one embodiment, as a result, the actuator assemblies of pallet grasping assembly 120 can be configured to grasp a variety of pallets having different lengths. More particularly, the third actuator assembly 130 may be moved inwardly different distances in order to accommodate pallets having different lengths. By way of example, the end-effectors 136 of first and second actuator assemblies 126 and 128 may be moved inwardly to contact a pallet according to its width dimension and the third actuator assembly 130 may be moved inwardly to contact the pallet according to its length dimension. In various embodiments, third actuator assembly 130 may be brought into contact with the pallet after the first and second actuators 126, 128 have already contacted the pallet and are applying forces to the pallet. Thereafter, in at least one such embodiment, the third actuator assembly 130 can apply a force to the pallet which is perpendicular, or at least substantially perpendicular, to the forces applied by the first and second actuator assemblies 126 and 128. In various embodiments, although not illustrated, an actuator assembly can include one or more brakes which can be configured to engage frame 124, for example, to hold, or at least temporarily hold, the actuator assembly in position. In at least one embodiment, such a brake can be actuated after the actuator assembly has applied a force to a pallet such that the actuator assembly can be locked into place to apply a constant force, or at least substantially constant force, to the pallet.

In various alternative embodiments, although not illustrated, the paths for moving the actuator assemblies and/or the directions for applying forces to a pallet may be oriented in skew, transverse, and/or oblique directions, for example. In at least one alternative embodiment, although not illustrated, a pallet grasping assembly may include one or more stationary actuator assemblies. More particularly, in at least one embodiment, a first actuator assembly may be stationary and a second actuator assembly may be configured to move a pallet against the first actuator assembly such that the pallet can be held between the first and second actuator assemblies. In certain embodiments, although a "stationary" actuator assembly may not be movable relative to its supporting frame, such as frame 124, for example, an actuator assembly can be considered to be "stationary" eventhough the actuator assembly can raise and lower an end-effector as outlined above and described in greater detail further below. In some embodiments, the pallet may already be positioned against the stationary actuator and, in such circumstances, the second actuator may abut the pallet to secure it against the stationary actuator. Furthermore, although the exemplary illustrated embodiment includes three actuator assemblies, embodiments are envisioned having more than or less than three actuator assemblies.

The end-effectors 136 depicted in FIGS. 12-16, for example, can include a flat, or at least substantially flat, surface which can be configured to abut a pallet as described above. In at least one embodiment, at least a portion of end-effectors 136 can have a rough surface texture, serrations, and/or a raised pattern which can be configured to increase the coefficient of friction, and/or friction force, between the end-effectors and the pallet. End-effectors 136 are suitable, or even preferred in some applications, although other end-effectors in accordance with various embodiments of the present invention are envisioned. In certain embodiments, an end-effector can include one or more projections and/or recesses which can be configured to engage and support a pallet. In at least one embodiment, although not illustrated, an end-effector can include a lip extending from a distal portion of the end-effector, for example, wherein the lip can be configured to support a pallet. In use, in various embodiments, one or more end-effectors can engage or grasp a pallet by being brought into close opposition with the pallet such that a bottom surface of the pallet, for example, is supported by the lips extending from the end-effectors. In such embodiments, when the end-effectors are raised to lift the pallet, for example, the end-effectors can apply lifting forces to the pallet via the lips. In certain embodiments, the end-effectors can also include a surface which can be configured to abut, and/or apply a force to, a side of the pallet, for example, as described above. In any event, it is to be understood that the configuration of the end-effectors utilized in various embodiments may depend on the configuration of pallets to be moved and, accordingly, the devices and methods described herein can be adapted to grasp or engage such pallets.

Figure 12:
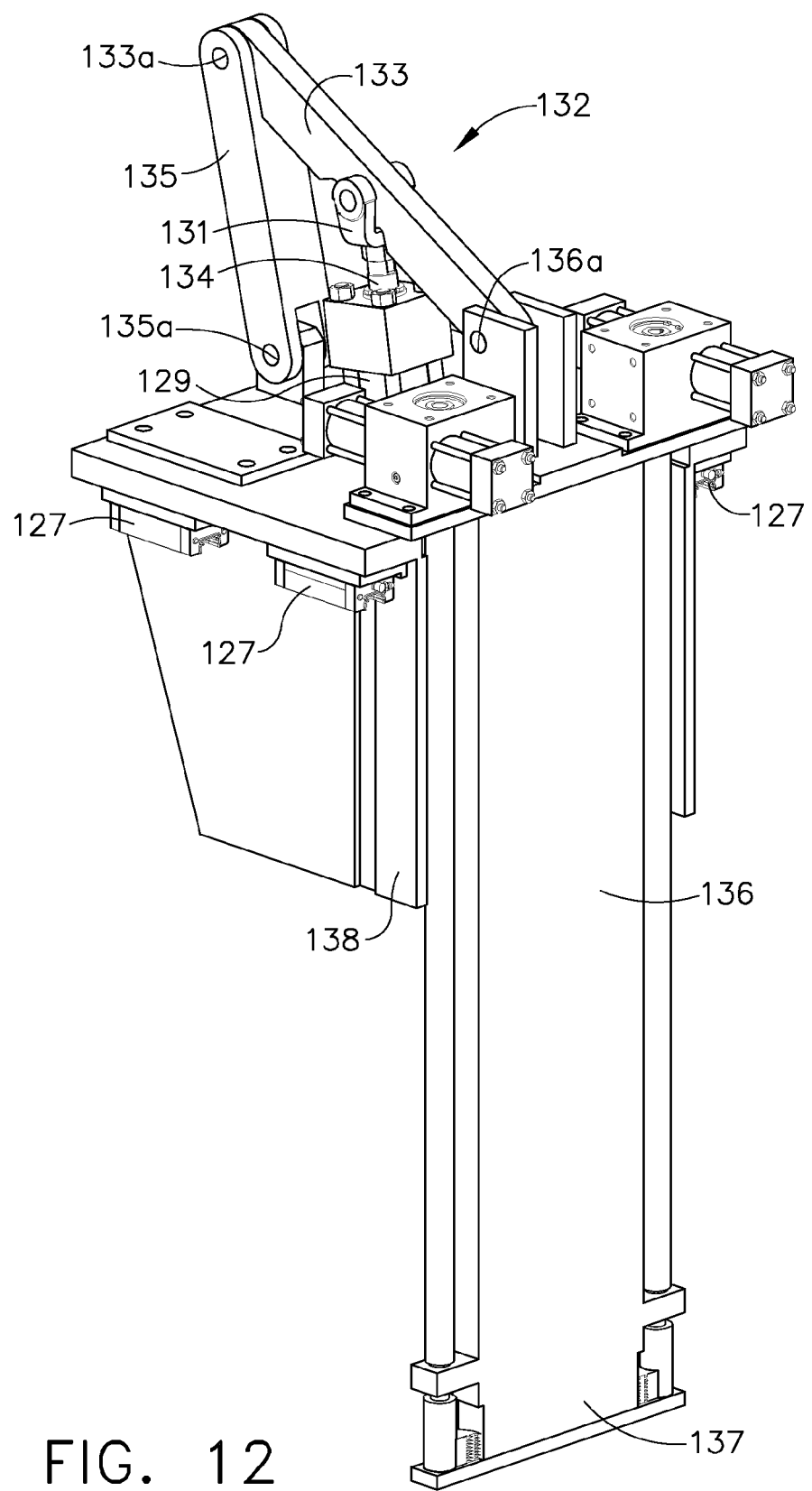
FIG. 12 is a perspective view of one of the actuator assemblies of FIG. 6 illustrated in an extended configuration.
Figure 13:
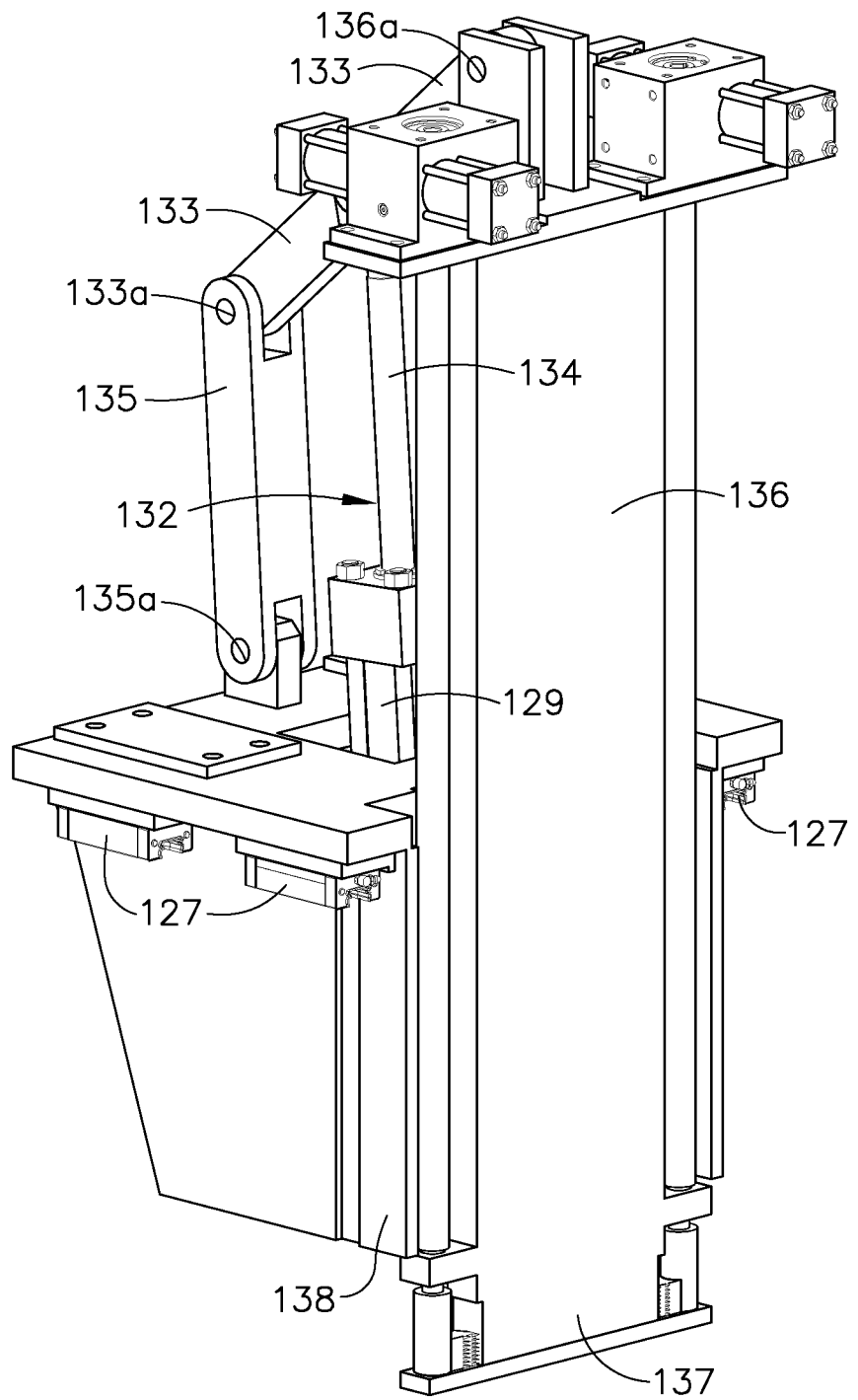
FIG. 13 is another perspective view of the actuator assembly of FIG. 12 illustrated in a retracted configuration.
Figure 14:
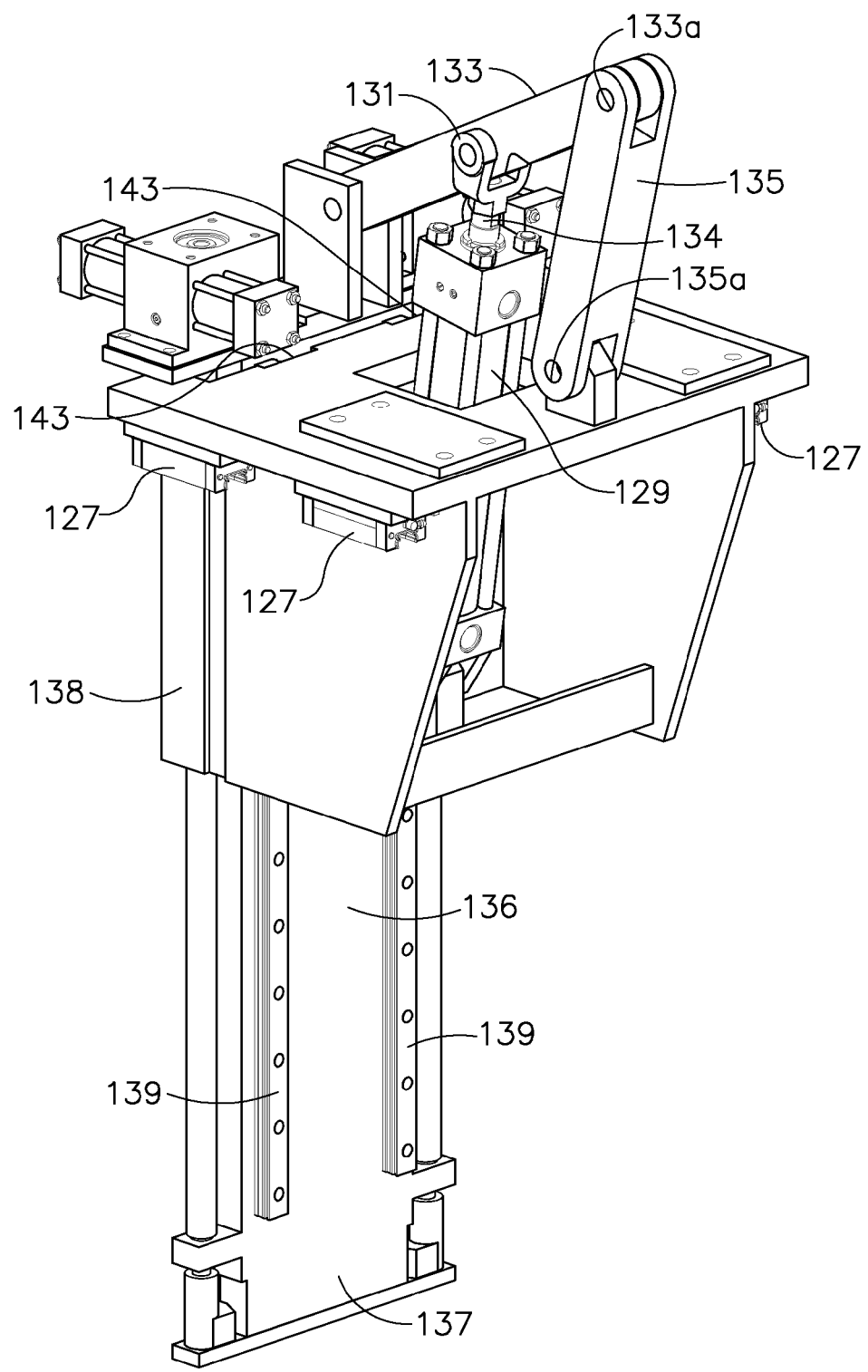
FIG. 14 is another perspective view of the actuator assembly of FIG. 12 illustrated in an extended configuration.

Once a pallet grasping assembly has grasped a pallet, the pallet grasping assembly can raise and/or lower the pallet. In various embodiments, referring again to FIG. 5, pallet grasping assembly 120 can be configured to lift a pallet off of car 106, for example, once the end-effectors 136 of actuator assemblies 126, 128, and 130 have been engaged with the pallet. In at least one embodiment, referring to FIGS. 12-15, each actuator assembly can include at least one actuator for moving the end-effector. In at least one such embodiment, each actuator assembly can include an actuator 132 having a piston cylinder 129 and a piston shaft 134 where piston shaft 134 can be hydraulically and/or pneumatically moved relative to piston cylinder 129. As illustrated in FIGS. 12 and 13, an end-effector 136 can be operably connected to piston shaft 134 such that, when piston shaft 134 is raised or lowered relative to piston cylinder 129, end-effector 136 can be raised or lowered as well. Accordingly, when end-effectors 136 are raised, the pallet engaged by the end-effectors 136 can be lifted upwardly and, when end-effectors 136 are lowered, the pallet can be lowered downwardly. Although embodiments having various couplers, cams, and/or linkages for transmitting motion and/or forces between piston shaft 134 and end-effector 136 are envisioned, the slider-crank assembly illustrated in FIGS. 12-15 can be utilized. In at least one such embodiment, the slider-crank assembly can include a coupler link 133, a connecting link 135, and a frame 138 which can be configured to co-operatively move and guide end-effector 136 as described in greater detail below.

In certain embodiments, piston shaft 134 can include a yoke 131 mounted thereto, or extending therefrom, which can be pinned to coupler link 133 such that the extension of piston shaft 134 relative to piston cylinder 129 can cause coupler link 133 to rotate about pin 133a and, in addition, connecting link 135 to rotate about pin 135a. Referring to FIGS. 12 and 13, the extension of piston shaft 134 upwardly can cause coupler link 133 to rotate counter-clockwise (as viewed in FIG. 12), wherein the rotation of coupler link 133 can cause connecting link 135 to rotate clockwise (again, as viewed in FIG. 12). Coupler link 133 can be pinned to end-effector 136 via pin 136a such that the movement of coupler link 133 can be transmitted to end-effector 136. For example, when coupler link 133 is rotated counter-clockwise, coupler link 133 can retract, or drive, end-effector 136 upwardly. Correspondingly, when piston shaft 134 is moved or pulled downwardly and coupler link 133 is rotated clockwise, coupler link 133 can drive end-effector 136 downwardly. In certain embodiments, referring to FIGS. 14 and 15, end-effectors 136 can include one or more rails 139 extending therefrom which can be received within one or more grooves, or slots, 143 in frame 138. When an end-effector 136 is moved by a coupler link 133 as described above, rails 139 and grooves 143 can be sized and configured to co-operatively define a path for end-effector 136 such that end-effector 136 slides relative to frame 138 in one of an upward or downward direction, for example. In various embodiments, rails 139 and grooves 143 can include co-operating dovetail configurations which can, in at least one embodiment, limit the movement of end-effector 136 along an axis defined by rails 139. Although not illustrated, other embodiments are envisioned in which end-effector 136 has one or more grooves and frame 137 has one or more rails extending therefrom. In any event, although end-effectors 136 can be slid in upward and downward directions as described above, end-effectors, in accordance with alternative embodiments, can be slid or moved in any suitable direction.

Once a pallet grasping assembly has grasped a pallet, further to the above, the pallet grasping assembly can translate or move the pallet to a pallet-staging, or delivery, position. In various embodiments, referring primarily to FIGS. 1 and 2, system 100 can further include a track 160 which can be configured to support and guide pallet grasping system 120 as it moves the pallet. In at least one embodiment, track 160 can include a first guide beam 162 including a first channel 164, a second guide beam 166 including a second guide channel 168, and, in addition, one or more support members for supporting guide beams 162 and 166. In at least one embodiment, such support members can include track supports or columns 170, floor plates 172 which can be configured to mount columns 170 to the ground and/or otherwise stabilize columns 170, and cross-members 174 which can stiffen track 160 and assist in maintaining a desirable alignment between first guide channel 164 and second guide channel 168.

Figure 9:
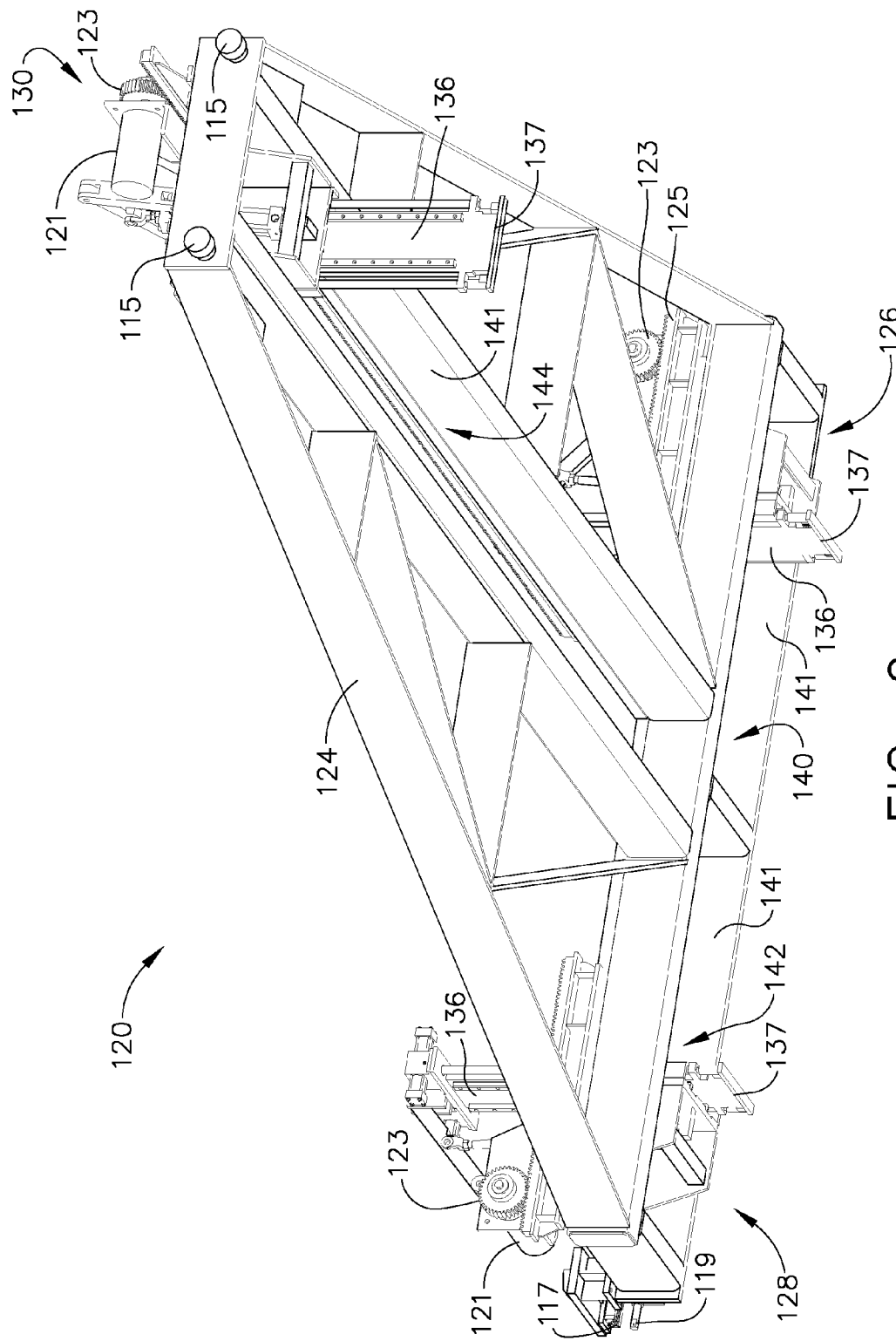
FIG. 9 is yet another perspective view of the pallet grasping assembly of FIG. 4.
Figure 10:
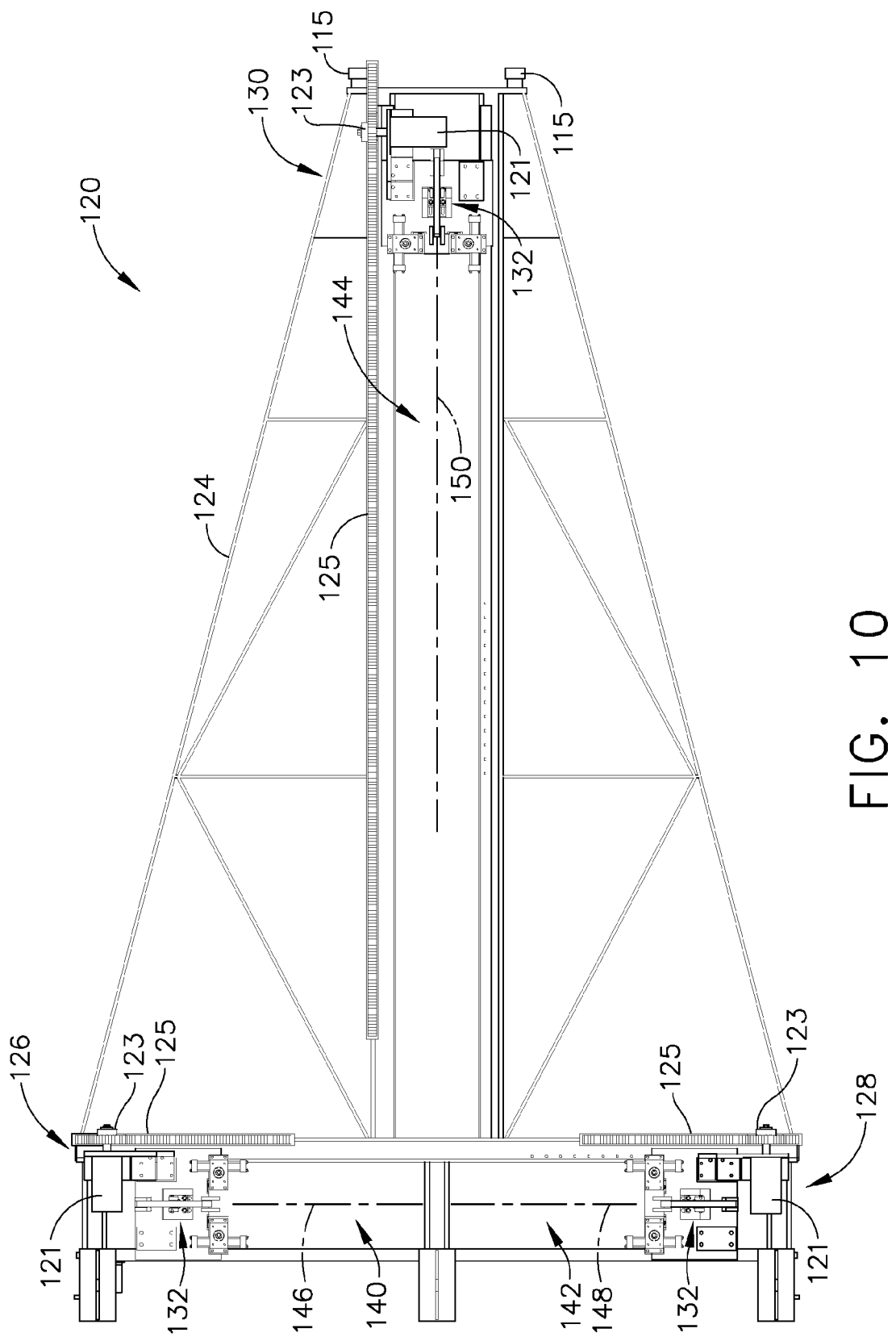
FIG. 10 is a top view of the pallet grasping assembly of FIG. 4.
Figure 11:
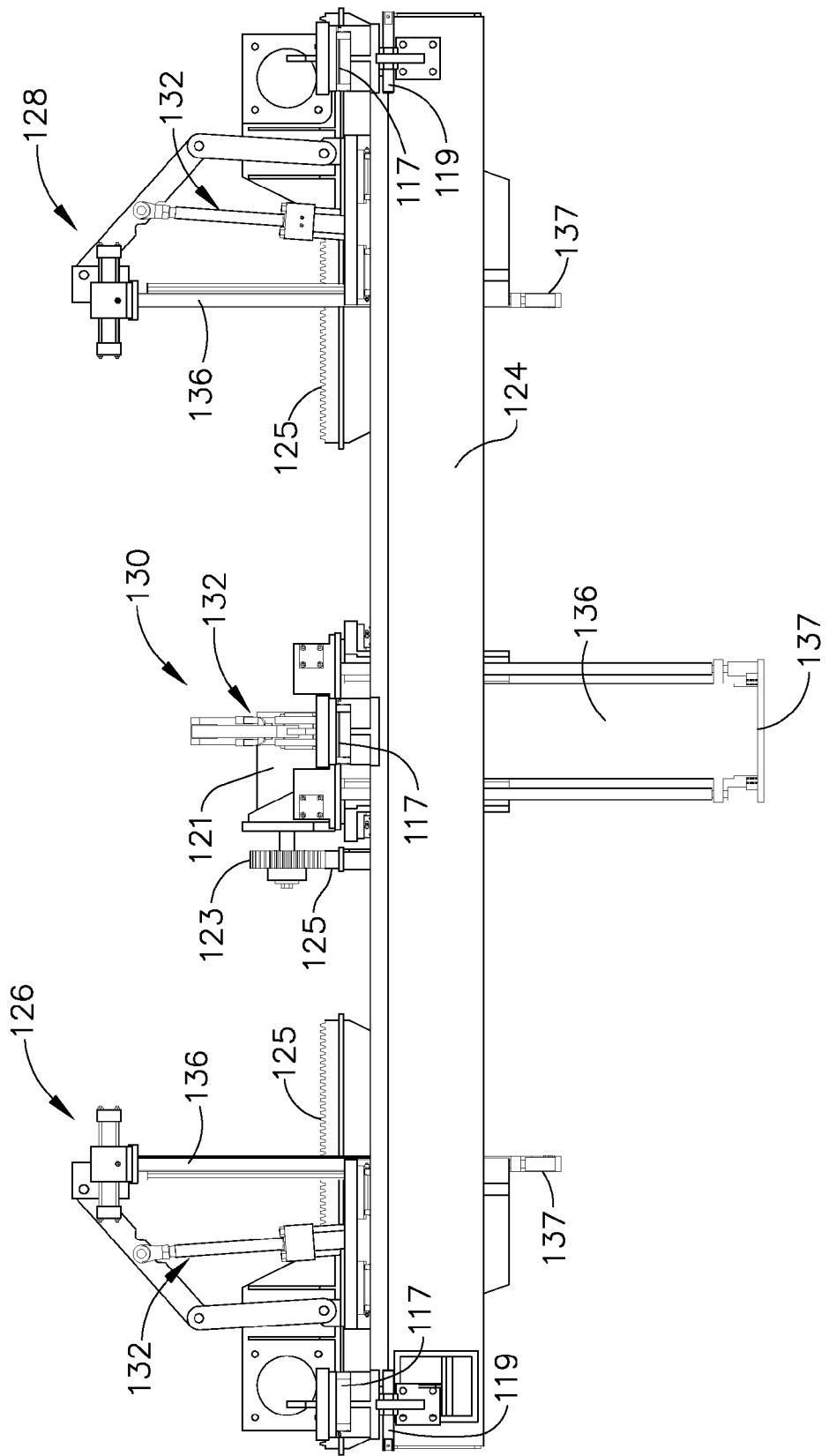
FIG. 11 is an elevational view of the pallet grasping assembly of FIG. 4.

In various embodiments, pallet grasping system 120 can include any suitable means for moving the pallet grasping system 120 relative to track 160. In at least one embodiment, pallet grasping system 120 can include one or more motors and one or more drive wheels operably engaged with the motor(s). In at least one such embodiment, a drive wheel can be in contact with at least one of the sidewalls of guide channel 164 and/or guide channel 168 such that, when the drive wheel is rotated by a motor, the drive wheel can propel pallet grasping assembly 120 along a predetermined path. The direction in which assembly 120 is propelled, i.e., toward or away from pick-up point 101, for example, can depend on the direction in which the drive wheel is rotated. Other embodiments are envisioned in which a rack and pinion arrangement can be utilized to propel pallet grasping assembly 120. In at least one such embodiment, the assembly 120 can include a motor, such as a stepper motor, for example, which can be configured to rotate a gear, such as a pinion gear, for example, which is meshingly engaged with a toothed rack mounted to and/or otherwise extending from guide beams 162, guide beam 166, and/or any other suitable portion of track 160. Other embodiments are envisioned which utilize chain drives and/or belt drives, for example, for moving pallet grasping assembly 120. In at least one such embodiment, referring to FIG. 6, frame 124 of grasping assembly 120 can include attachment points 119 which can be used to affix a drive chain, for example, to frame 124 such that the drive chain can impart motion to grasping assembly 120. In certain embodiments, referring to FIG. 11, frame 124 can further include one or more guide supports 117 which can be operably engaged with one or more guide rails (not illustrated) on guide beam 162, for example, such that guide supports 117 and the guide rails can guide and support pallet grasping assembly 120. Referring to FIGS. 8 and 9, frame 124 can also include guide rollers 115 which can be configured to be supported by guide beam 166, for example, and facilitate relative movement between frame 124 and guide beam 166.

Figure 17:
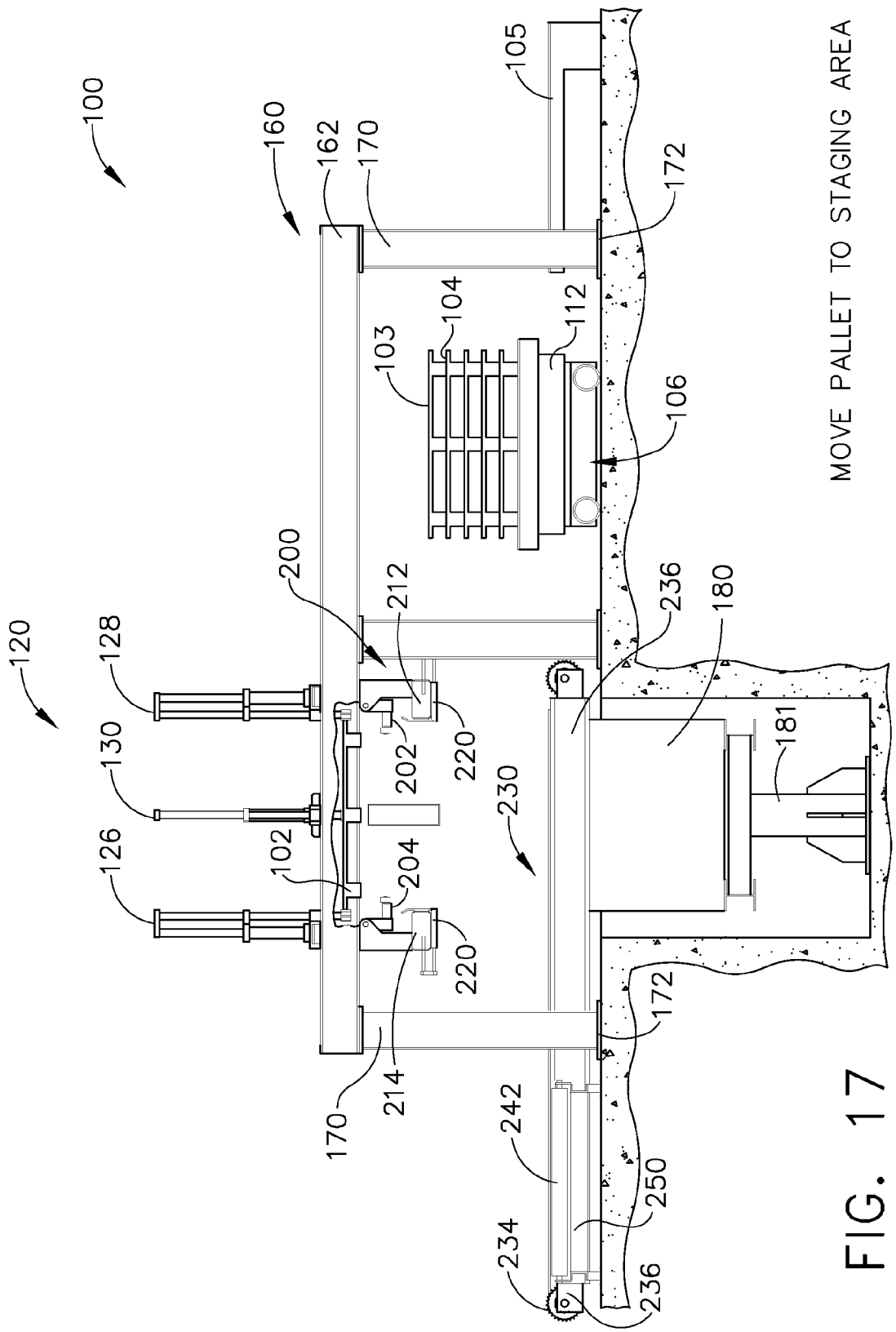
FIG. 17 is an elevational view of the system of FIG. 1 illustrating the first pallet of FIG. 4 being held in a staging position by the pallet grasping assembly.
Figure 18:
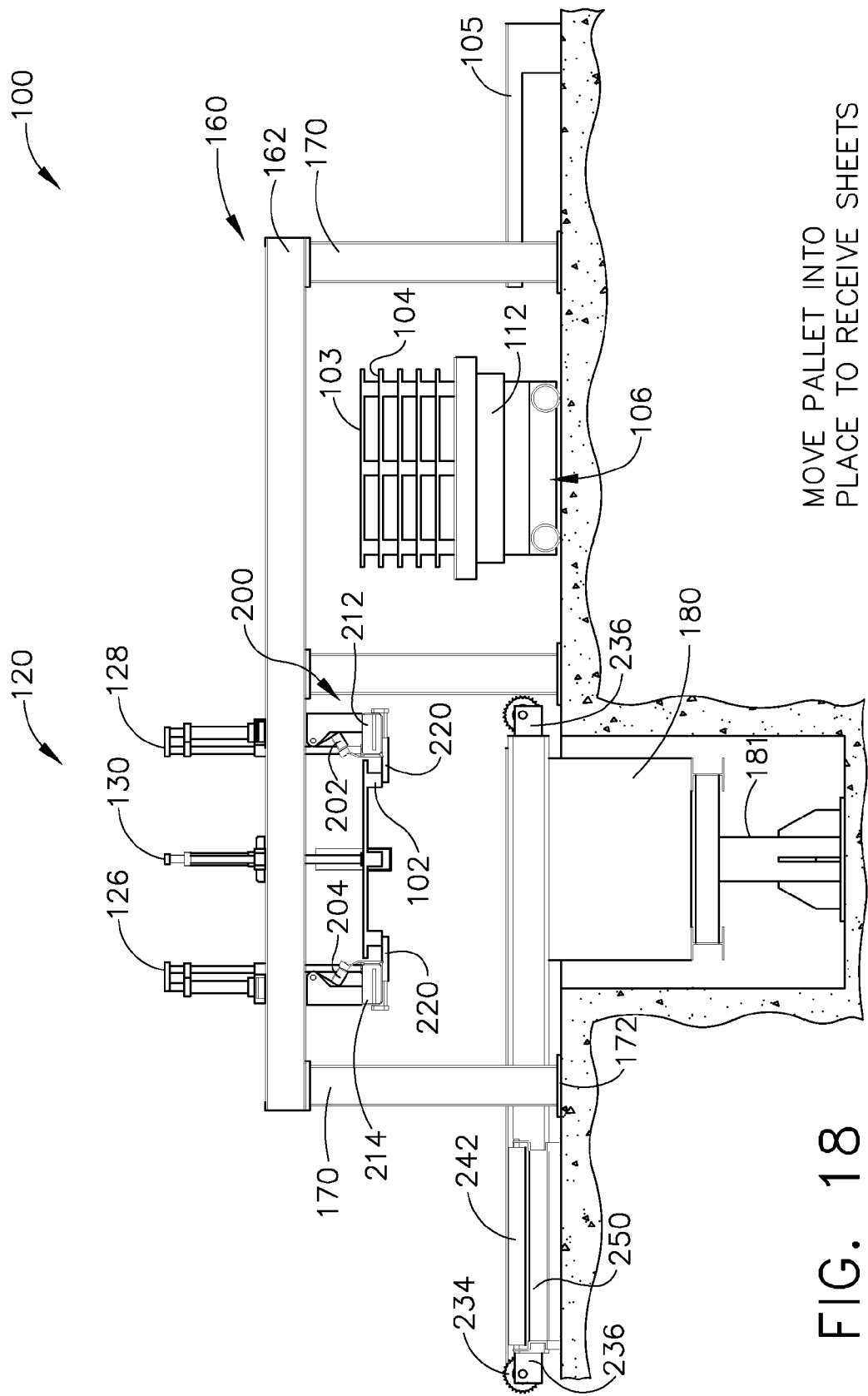
FIG. 18 is an elevational view of the system of FIG. 1 illustrating the first pallet of FIG. 4 being supported in a loading position by extendable pallet supports and illustrating first and second sheet supports which have been pivoted downwardly to permit the first pallet to pass thereby.

In various embodiments, a pallet grasping assembly can be configured to move a pallet to a sheet stacking assembly such that sheets of material can be stacked on the pallet. In at least one embodiment, referring to FIG. 17, pallet grasping assembly 120 can be configured to move a first pallet 102 over sheet stacking assembly 200 and lower pallet 102 therein. In at least one embodiment, although not illustrated, the pallet grasping assembly 120 can be configured to position pallet 102 over elevator 180 and lower the pallet directly onto elevator 180. In other various embodiments, referring to FIG. 18, the pallet grasping assembly 200 can be configured to lower first pallet 102 onto extendable pallet supports. More particularly, in at least one embodiment, sheet stacking assembly 200 can include one or more extendable pallet supports 220 which can be configured to support a pallet beneath first sheet support 202, beneath second sheet support 204, and/or above elevator 180, which are all described in greater detail below. In various embodiments, pallet grasping assembly 120 can be configured to center a pallet between first sheet support 202 and second sheet support 204, for example. In at least one such embodiment, the end-effectors 136 of pallet grasping assembly 120 can be positioned such that, when end-effectors 136 lower the pallet onto pallet supports 220, for example, the pallet can be centered, or at least substantially centered, between sheet supports 202 and 204, for example. In various embodiments, track 160 can include a positive stop, or datum, against which pallet grasping assembly 120 can abut in order to repeatably align assembly 120, and the pallet held by end-effectors 136, with sheet supports 202 and 204. In at least some embodiments, system 100 can further include a computer which can adjustably position pallet grasping assembly 120, and/or the actuator assemblies movably mounted thereon, relative to sheet stacking system 200 such that a pallet is suitably aligned with sheet supports 202 and 204.

Figure 21:
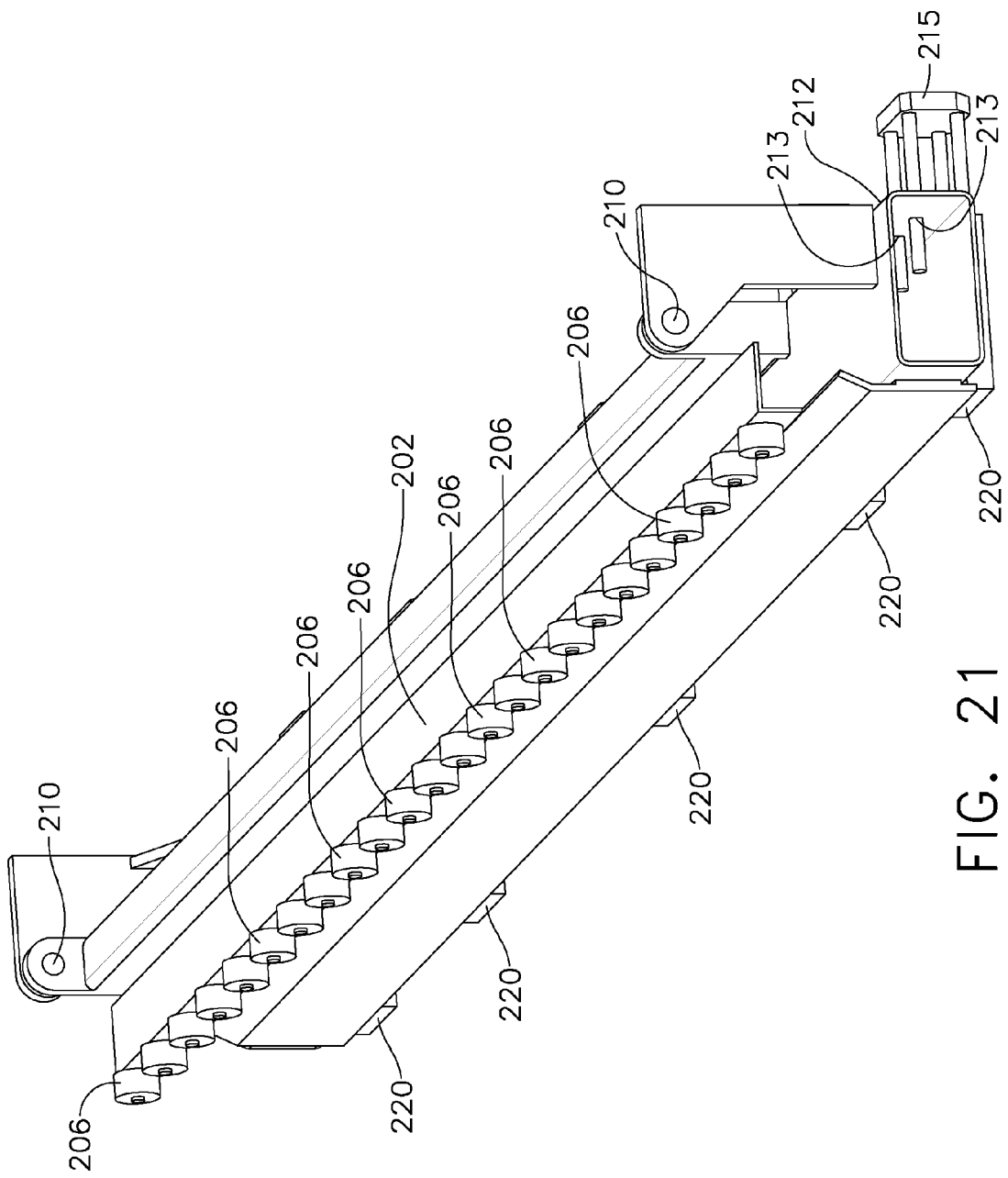
FIG. 21 is a perspective view of one of the sheet supports of FIG. 18 in a sheet-supporting configuration.
Figure 24:
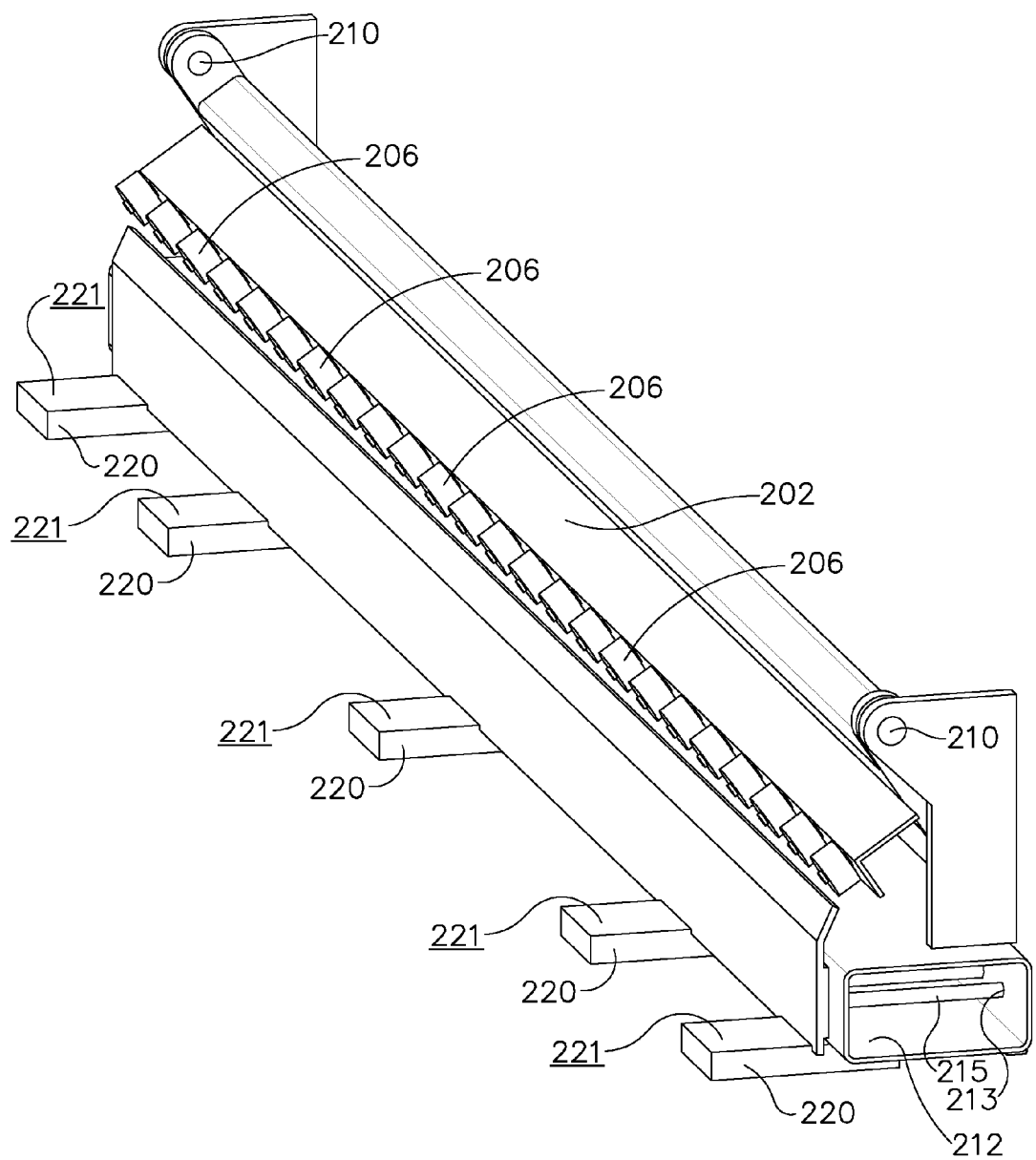
FIG. 24 is a perspective view of the sheet support of FIG. 21 pivoted downwardly into a sheet-dropping configuration.

In certain embodiments, referring to FIG. 24, pallet supports 220 can each include one or more flat, or at least substantially flat, surfaces 221 for supporting a pallet. In at least some embodiments, although not illustrated, at least a portion of pallet supports 220, for example, can include projections, recesses, and/or any other suitable configuration which can be configured to retain a pallet thereon. Referring primarily to FIG. 21, first frame rail 212 can include one or more guide apertures 213 which can be configured to slidably support and guide one or more rod assemblies 215 which can be attached to, or otherwise operably coupled with, one or more extendable pallet supports 220.

Figure 28:
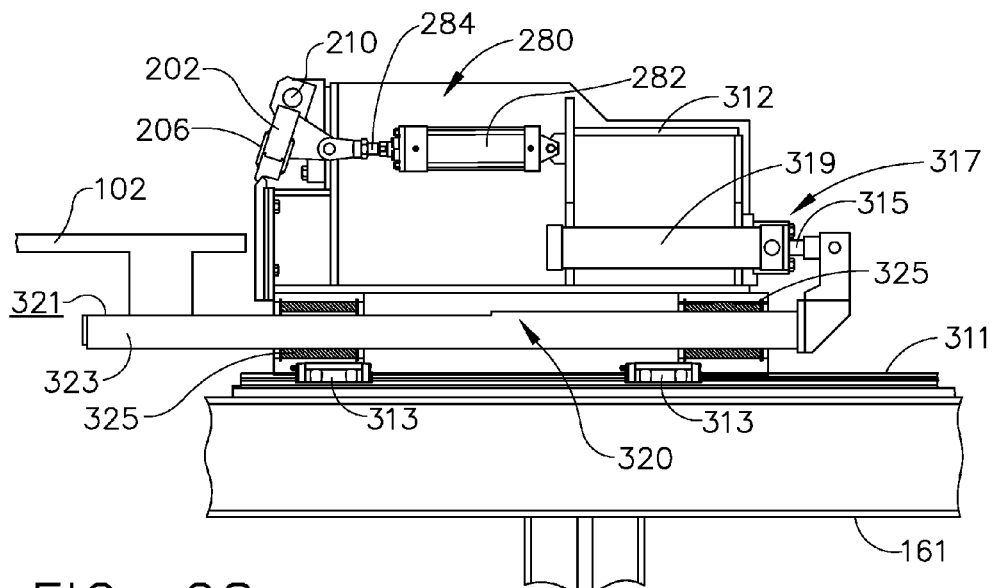
FIG. 28 is a partial cross-sectional view of an actuator for pivoting a sheet support and an actuator for extending and retracting a pallet support in accordance with at least one embodiment of the present invention wherein the sheet support is illustrated in a downwardly-pivoted, or sheet-dropping, position to allow a pallet to be placed on the extended pallet support.
Figure 32:
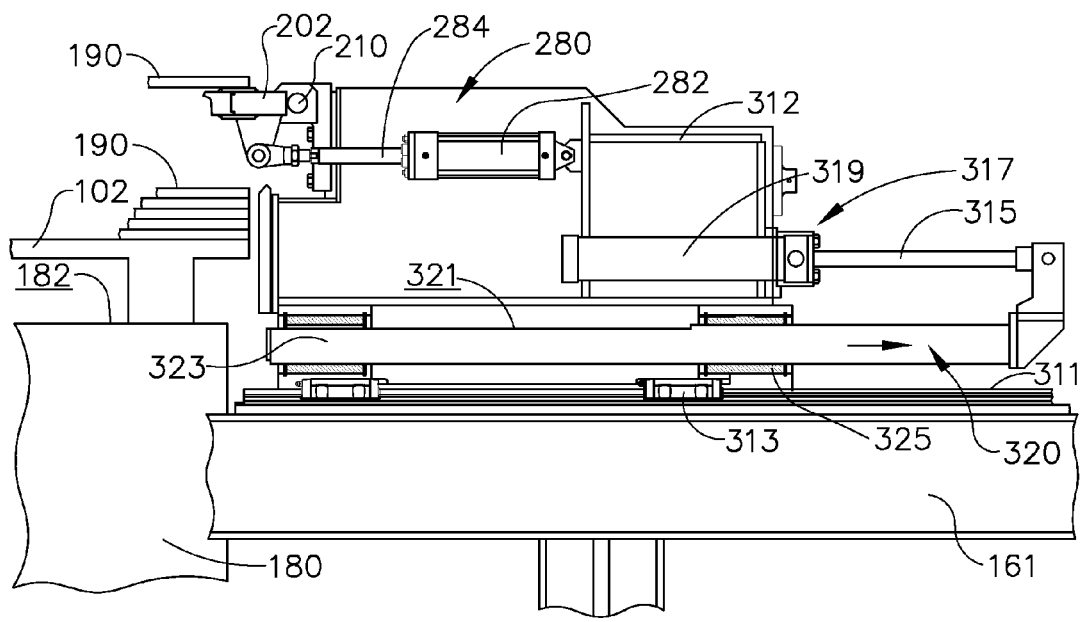
FIG. 32 is a partial cross-sectional view illustrating the elevator of FIG. 25 supporting the pallet of FIG. 28 and illustrating the pallet support of FIG. 28 in a retracted position.
Figure 33:
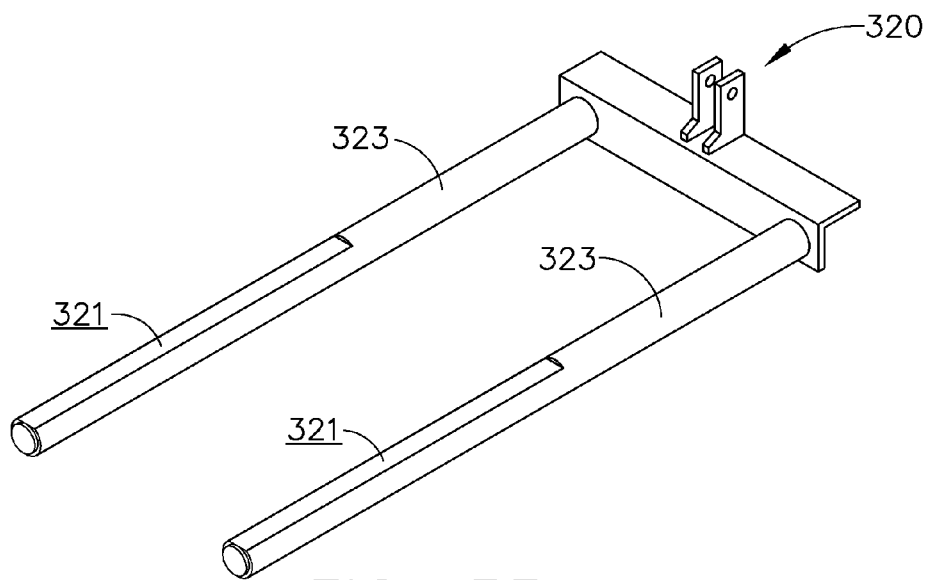
FIG. 33 is a perspective view of the pallet support of FIG. 28.

Referring to FIGS. 21 and 24, supports 220 can be extended from and/or retracted relative to first frame rail 212 and/or second frame rail 214 by one or more actuators (not illustrated in this embodiment), such as hydraulic and/or pneumatic cylinder assemblies, for example, which can be operably coupled to pallet supports 220 and/or rod assemblies 215. Referring to the embodiment illustrated in FIGS. 28-33, a sheet stacking assembly can include one or more extendable pallet supports 320 which can be extended relative to frame rail 312 by actuators 317. In at least one such embodiment, an actuator 317 can include a cylinder 319 mounted to, or at least relative to, frame rail 312 and, in addition, a piston rod 315 which can be extended and/or retracted relative to cylinder 319. In various embodiments, a pallet support 320 can be moved between a first, or extended, position illustrated in FIG. 28 and a second, or retracted, position illustrated in FIG. 32. In at least one embodiment, referring again to FIG. 28, frame rail 312 can further include one or more bearings 325 which can be configured to slidably support one or more pallet supports 320. In certain embodiments, referring now to FIG. 33, a pallet support 320 can include one or more cylindrical, or at least substantially cylindrical, members 323 which can be slidably received within bearings 325. Similar to the above, in at least one embodiment, cylindrical members 323 can include flat surfaces 321 which can be configured to support a pallet as outlined above.

Figure 19:
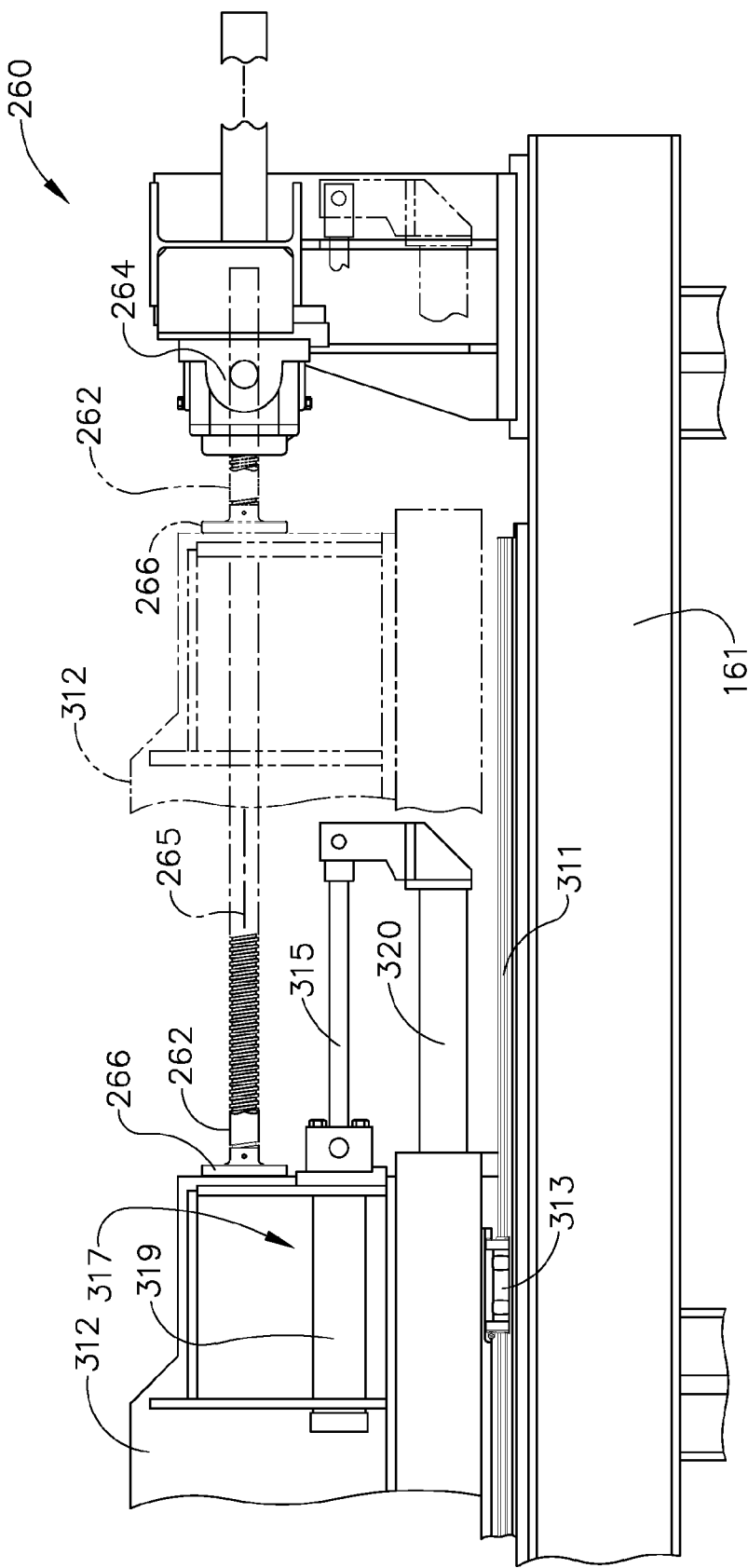
FIG. 19 is a diagram illustrating an actuator assembly configured to move one of the sheet supports of FIG. 18 outwardly to allow the first pallet to pass by the sheet supports and, in addition, move the sheet support inwardly once the first pallet has passed thereby in accordance with at least one embodiment of the present invention.

As discussed above, referring again to FIG. 18, pallet grasping assembly 120, for example, can be configured to position first pallet 102, for example, on extendable pallet supports 220. In various embodiments, first rail 212 and/or second rail 214 may be moved away from each other to allow the pallet grasping assembly 120 and the pallet 102, for example, to pass by first and second sheet supports 202, 204, for example, as pallet 102 is placed on pallet supports 220. Stated another way, owing to certain configurations of sheet supports 202 and 204, for example, rail 212 and/or rail 214 may have to be slid outwardly such that the end-effectors 136 of pallet grasping assembly 120 do not collide with, or are unsuitably impeded by, rails 212 and 214. In certain embodiments, referring to FIG. 19, rail 312, for example, can be slidably supported by frame 161 such that rail 312 can be slid between a first, or inward, position (shown in solid lines in FIG. 19) and a second, or outward, position (shown in phantom lines in FIG. 19). In order to move rail 312, sheet stacking system 200 can further include one or more actuator assemblies 260. In at least one embodiment, an actuator assembly 260 can include a jack screw, or lead screw, arrangement which can be configured to adjustably position rail 312. In various embodiments, referring to FIG. 19, each actuator assembly 260 can include one or more threaded shafts 262, one or more motors 264 for driving shafts 262, and, in addition, one or more distal end-effectors 266 operably connected to rail 312. In at least one embodiment, a motor 264 can include a rotatable member, or shaft, operably engaged with a threaded shaft 262 such that, when the motor shaft is rotated, the threaded shaft 262 can be displaced along axis 265. Depending on the direction in which the motor shaft is rotated, the motor 264 can drive the threaded shaft 262 in one of an inward or an outward direction. In various embodiments, referring again to FIG. 19, rail 312 can further include one or more guide supports 313 which can be configured to co-operate with one or more guides 311 to define a path for rail 312. In at least one embodiment, guide 311 can be mounted to or extend from frame 161, for example. In various embodiments, such a path can be linear, or at least substantially linear, although, in at least some embodiments, the path can include one or more curved portions and/or one or more linear portions. In any event, after the first pallet 102 has been placed onto the pallet supports, the frame rails can be moved inwardly once again.

Figure 20:
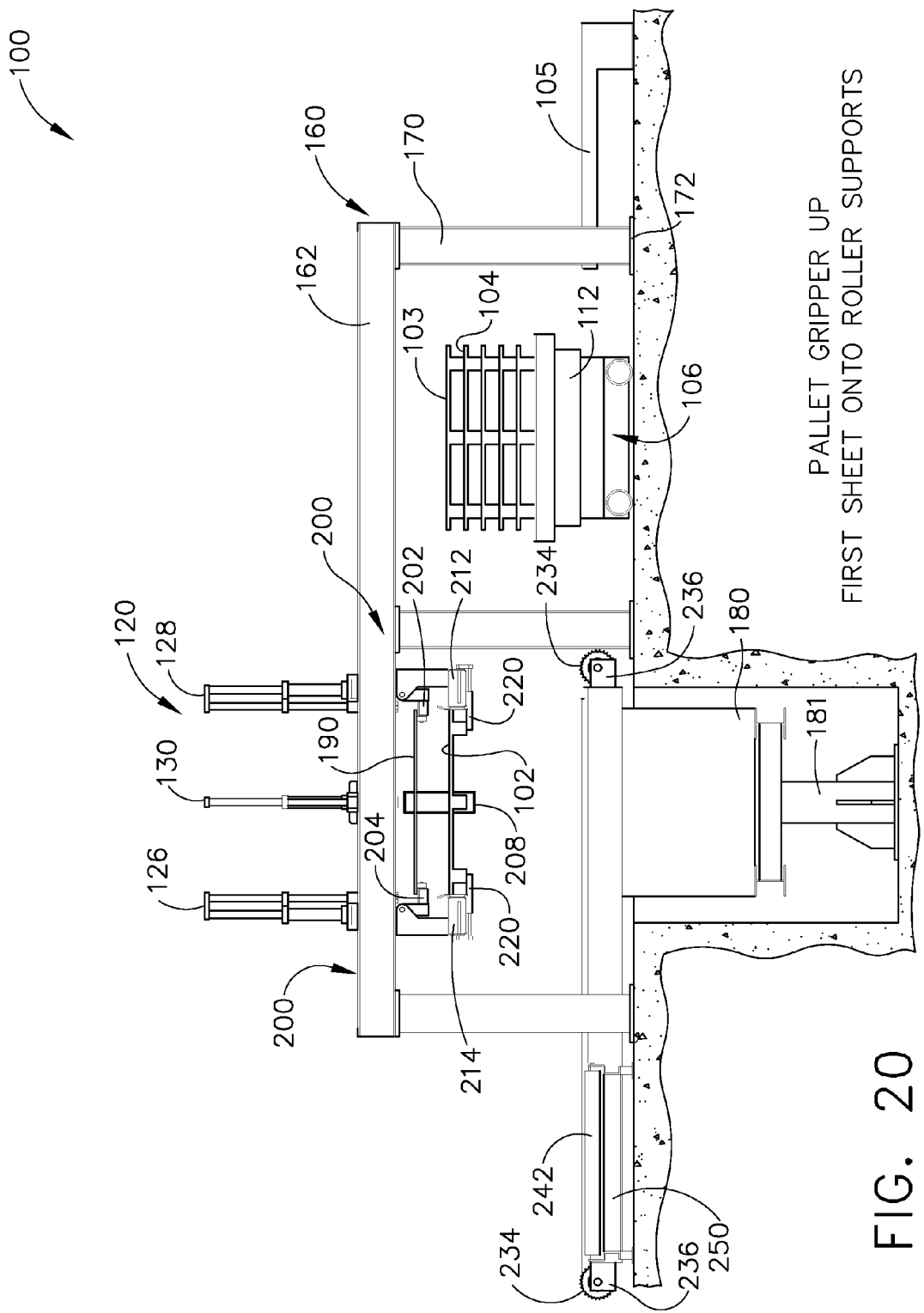
FIG. 20 is an elevational view of the system of FIG. 1 illustrating a sheet of material supported by the first and second sheet supports.
Figure 22:
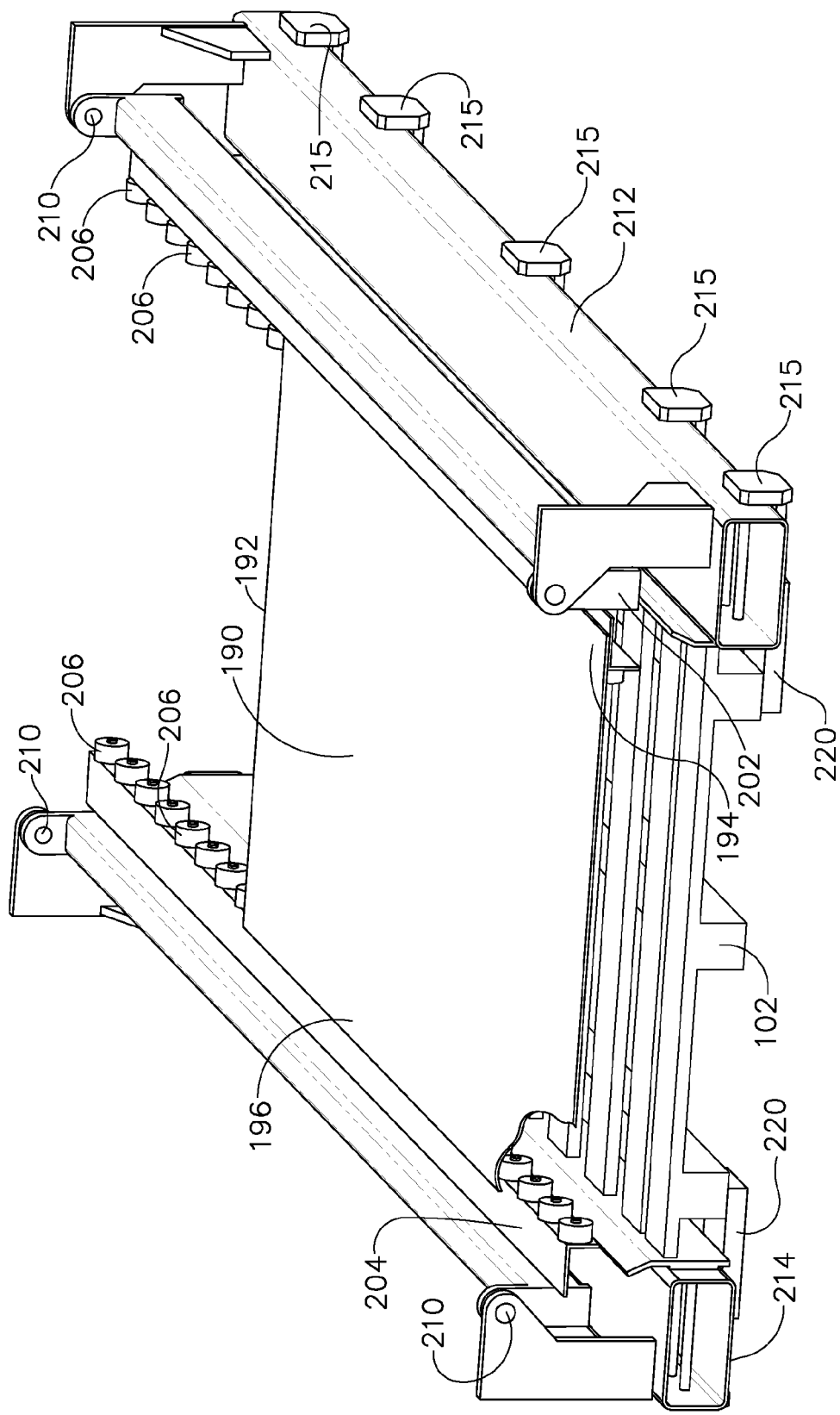
FIG. 22 is a perspective view of a sheet of material supported by the first and second sheet supports and, in addition, a pallet supported by the extendable pallet supports of FIG. 18.

Once first pallet 102 is supported, sheet stacking assembly 200 can be configured to stack sheets of material, such as one or more sheets of material 190 (FIG. 20), for example, onto pallet 102. In various embodiments, the sheets of material can be comprised of sheet steel, cold-rolled steel, hot-rolled steel, stainless steel, steel alloys, copper, copper alloys, brass alloys, aluminum, aluminum alloys, and/or any other suitable metal and/or non-metal, for example. As outlined above, referring to FIG. 20, sheet stacking assembly 200 can include one or more sheet supports, such as first sheet support 202 and second sheet support 204, for example, which can be configured to receive and support one or more sheets of material. In at least one embodiment, referring to FIG. 21, one or more of the sheet supports can include rollers 206 which can facilitate relative sliding movement, and/or other suitable relative movement, between the sheet of material and sheet supports 202 and 204, for example. In certain embodiments, referring to FIG. 22, sheet of material 190 can include a first edge portion 194 which can be supported by the first sheet support 202 and, in addition, a second edge portion 196, which can be supported by the second sheet support 204. In certain embodiments, a sheet stacking assembly can include end stops, such as backstop 208 (FIG. 20), for example, which can be configured to control the position, and/or limit the movement, of sheet 190 on sheet supports 202 and 204. In at least one such embodiment, referring again to FIG. 22, the sheet of material 190 can be slid onto sheets supports 202 and 204 until back edge 192 of sheet 190, for example, contacts backstop 208. Furthermore, although not illustrated, sheet stacking assembly 200 can further include one or more front stops for controlling, or limiting the movement of, the front edges of sheets 190, for example. Although the sheets of material in the illustrated embodiments are rectangular, or at least substantially rectangular, and have readily definable edges, other embodiments are envisioned in which the sheets of material can have any suitable shape or shapes.

Figure 23:
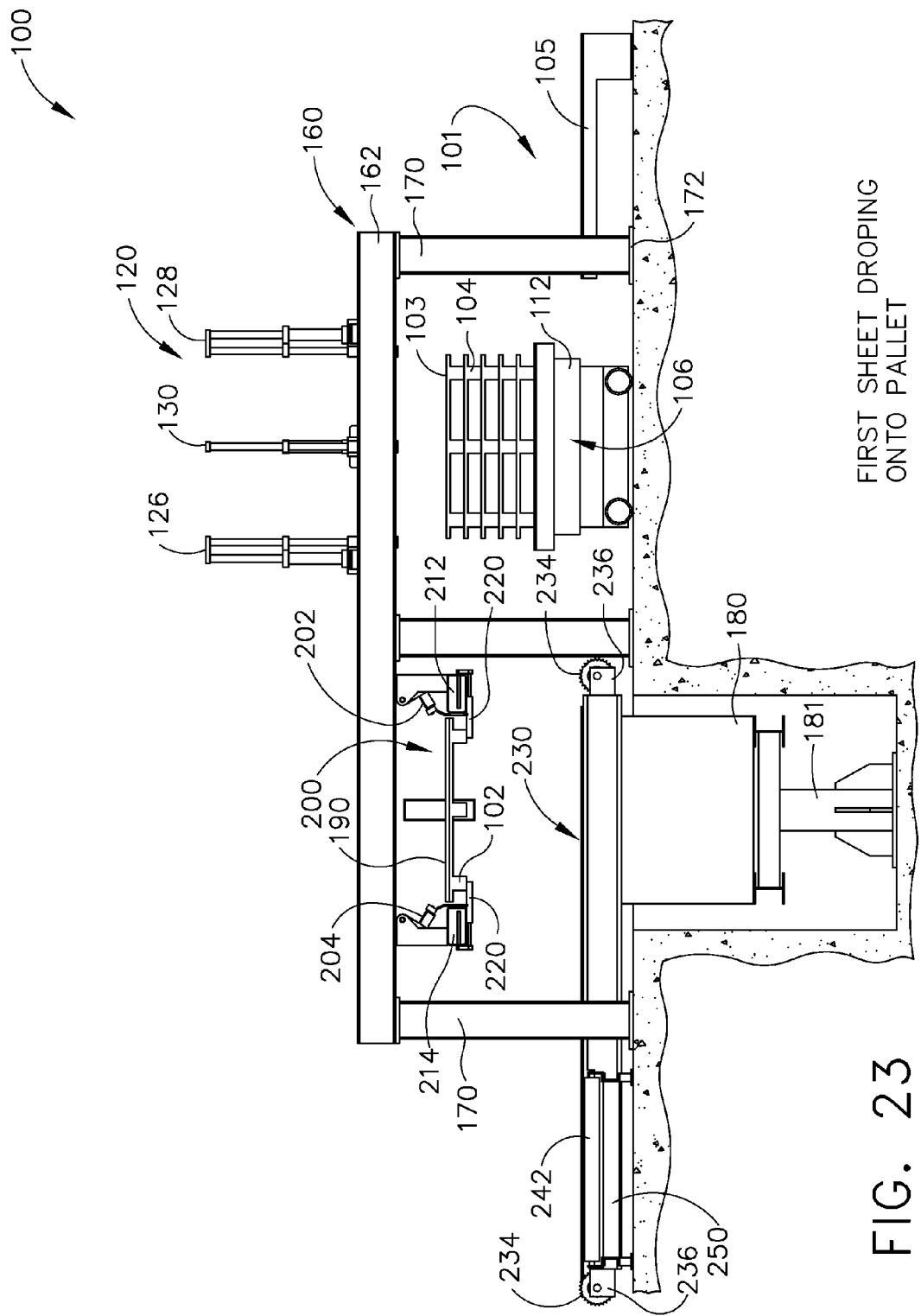
FIG. 23 is an elevational view of the system of FIG. 1 illustrating a sheet of material being dropped onto the first pallet of FIG. 4 and illustrating the pallet grasping assembly en route to obtain a second pallet.
Figure 29:
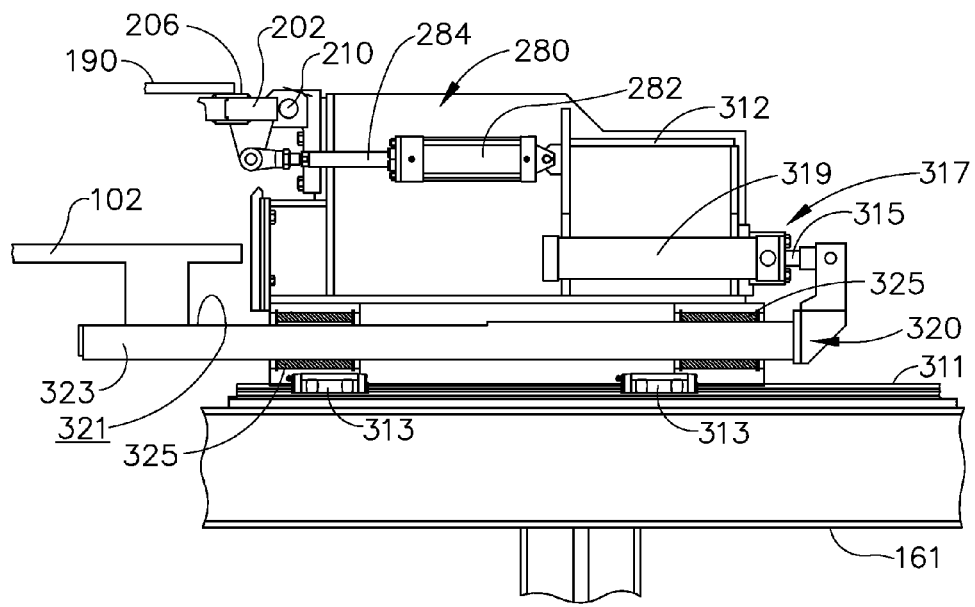
FIG. 29 is a partial cross-sectional view illustrating the sheet support of FIG. 28 in a sheet-supporting position, a sheet of material supported by the sheet support, and the pallet support of FIG. 28 in an extended position.
Figure 30:
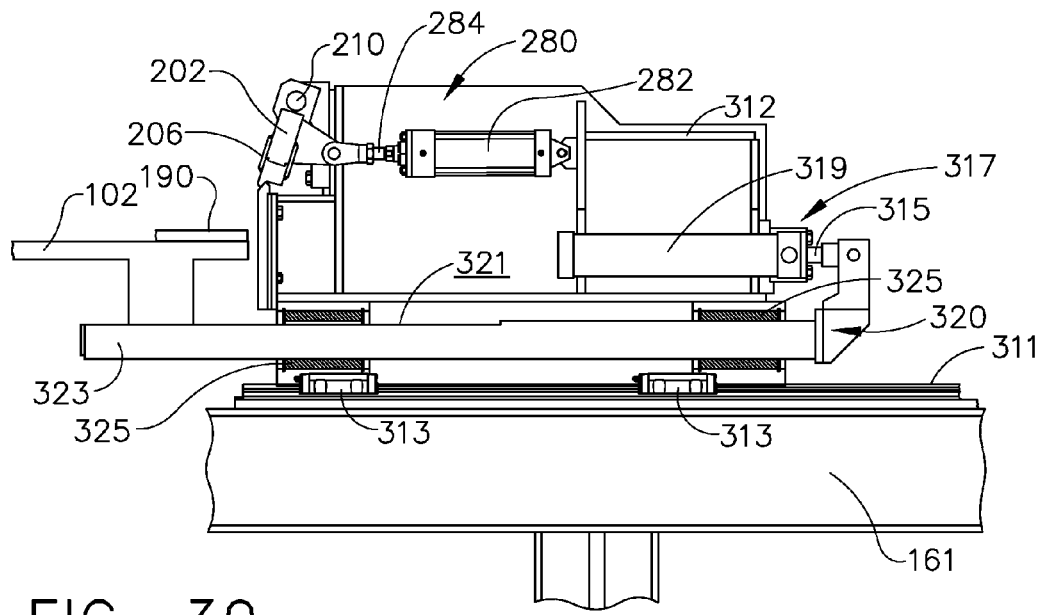
FIG. 30 is a partial cross-sectional view illustrating the sheet support of FIG. 28 in a sheet-dropping position and the sheet of material positioned on the pallet of FIG. 28.
Figure 31:
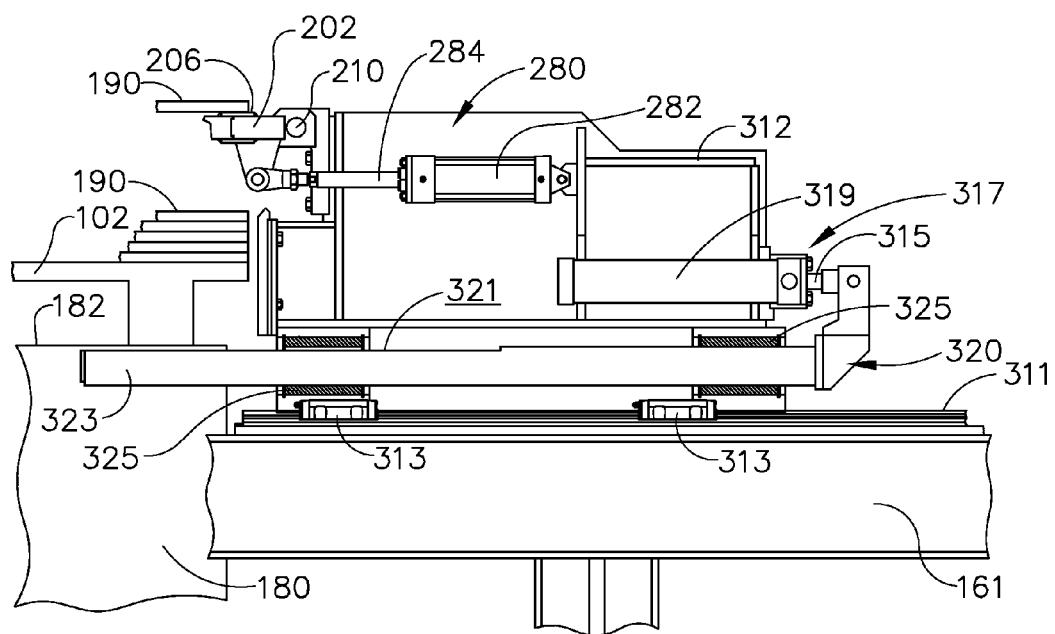
FIG. 31 is a partial cross-sectional view illustrating the elevator of FIG. 25 supporting the pallet of FIG. 28 and illustrating the pallet support of FIG. 28 in an extended position.

Once a sheet, or sheets, of material have been positioned on the sheet supports, such as sheet supports 202 and 204, for example, the sheet(s) of material may be stacked on a pallet. In various embodiments, referring to FIG. 23, sheet supports 202 and 204 can be configured to lower, or drop, sheet 190 onto pallet 102. In at least one such embodiment, first sheet support 202 can be rotatably supported by first frame rail 212 and, similarly, second sheet support 204 can be rotatably supported by second frame rail 214 such that, referring to FIG. 24, the sheet supports 202 and 204 can be configured to rotate, or pivot, downwardly with respect to frame rails 212 and 214 about pivots 210. Thereafter, sheet supports 202 and 204 can be rotated upwardly such that they can receive and support another sheet of material. In various embodiments, sheet supports 202 and 204 can be raised and lowered by hydraulic and/or pneumatic actuators, for example. In at least one such embodiment, referring to FIGS. 28 and 29, an actuator 280 can be operably connected to sheet support 202 and frame rail 212, for example, and can be configured to rotate sheet support 202 between a down, or sheet-dropping, position illustrated in FIG. 28 and an up, or sheet-supporting, position illustrated in FIG. 29. In at least one embodiment, actuator 280 can include a piston cylinder 282 mounted to frame rail 312, for example, and, in addition, a piston rod 284 which can be moved relative to piston cylinder 282 between a retracted position (FIG. 28) and an extended position (FIG. 29). Although not illustrated, other embodiments are envisioned in which a motor, for example, can be used to rotate sheet support 202 relative to frame rail 212, for example.

Figure 25:
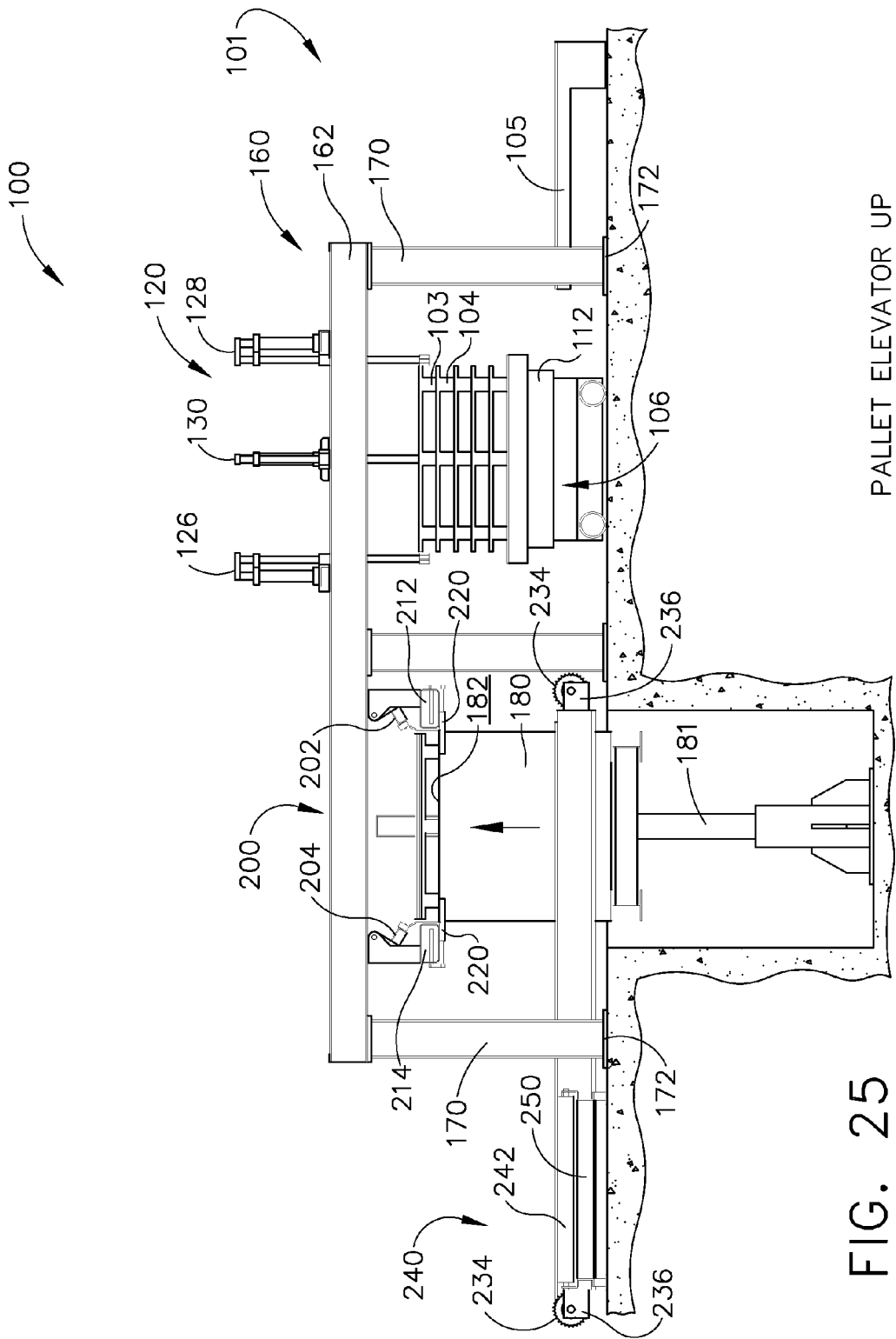
FIG. 25 is an elevational view of the system of FIG. 1 illustrating an elevator being raised to support the first pallet and illustrating the pallet grasping assembly engaged with the second pallet.
Figure 26:
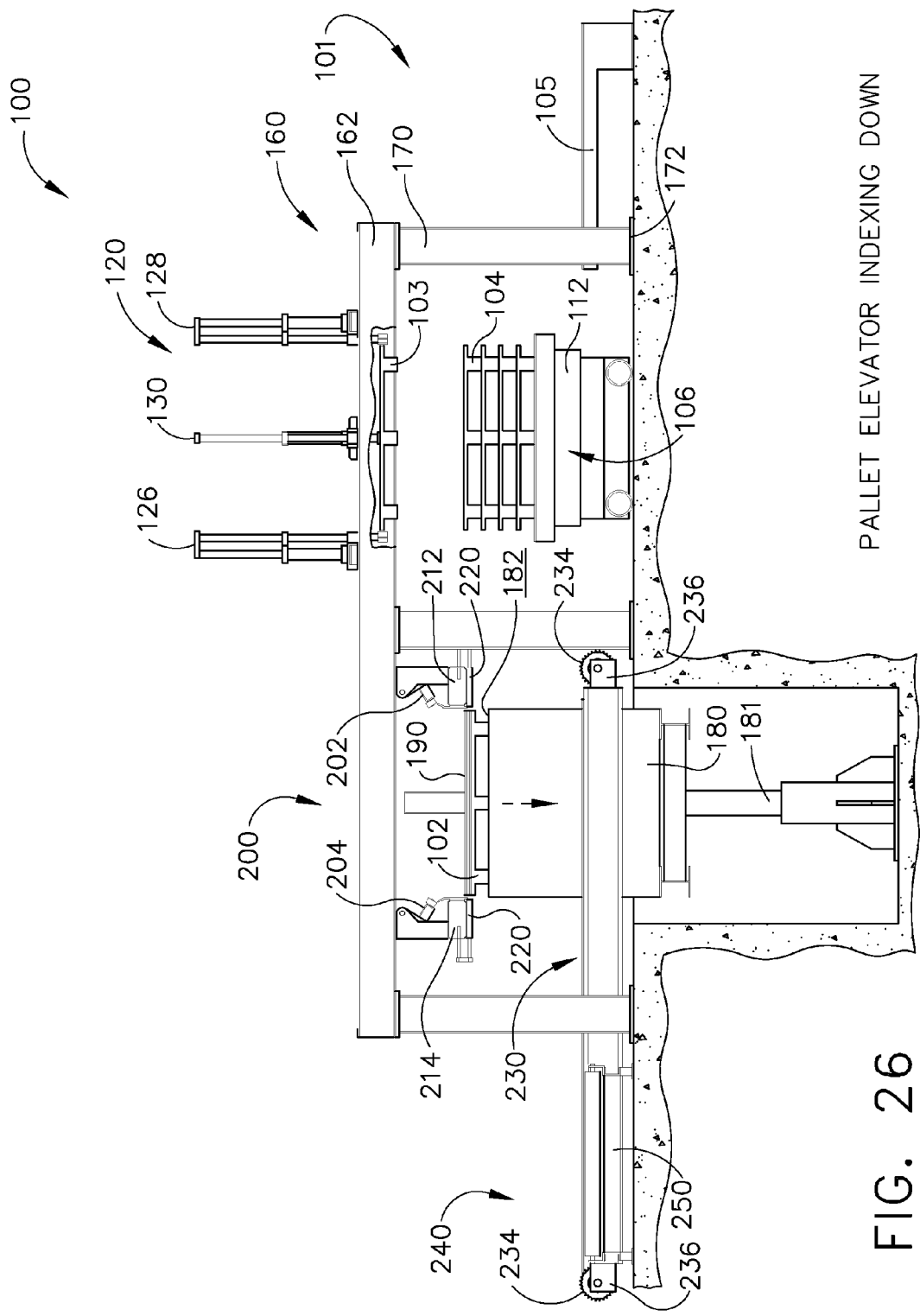
FIG. 26 is an elevational view of the system of FIG. 1 illustrating the extendable pallet supports in a retracted position and illustrating the second pallet lifted off of the pallet car by the pallet grasping assembly.
Figure 27:
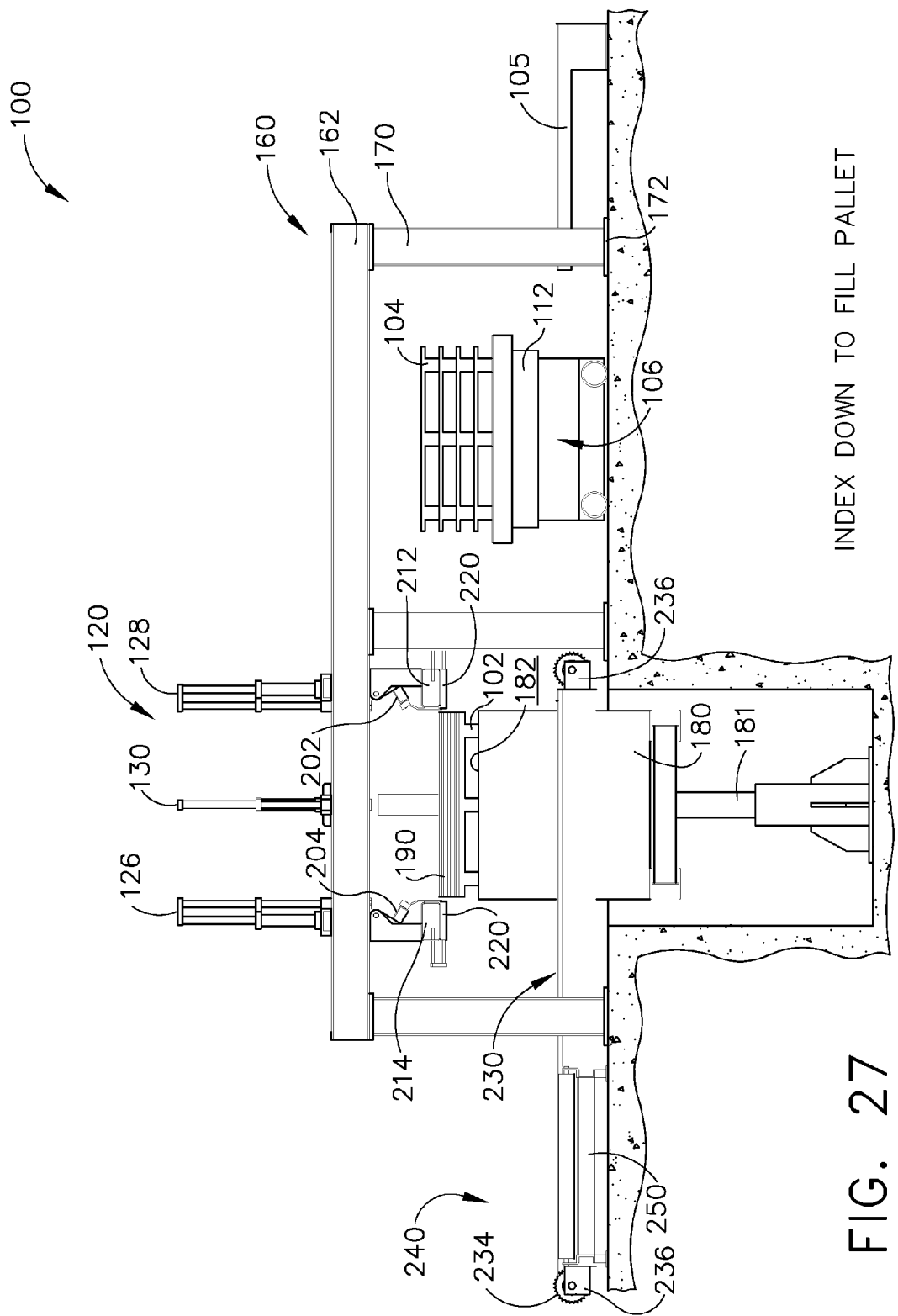
FIG. 27 is an elevational view of the system of FIG. 1 illustrating the elevator of FIG. 25 being indexed downwardly as sheets of material are being stacked on the first pallet and illustrating the second pallet in a staging position positioned above the first pallet.
Figure 40:
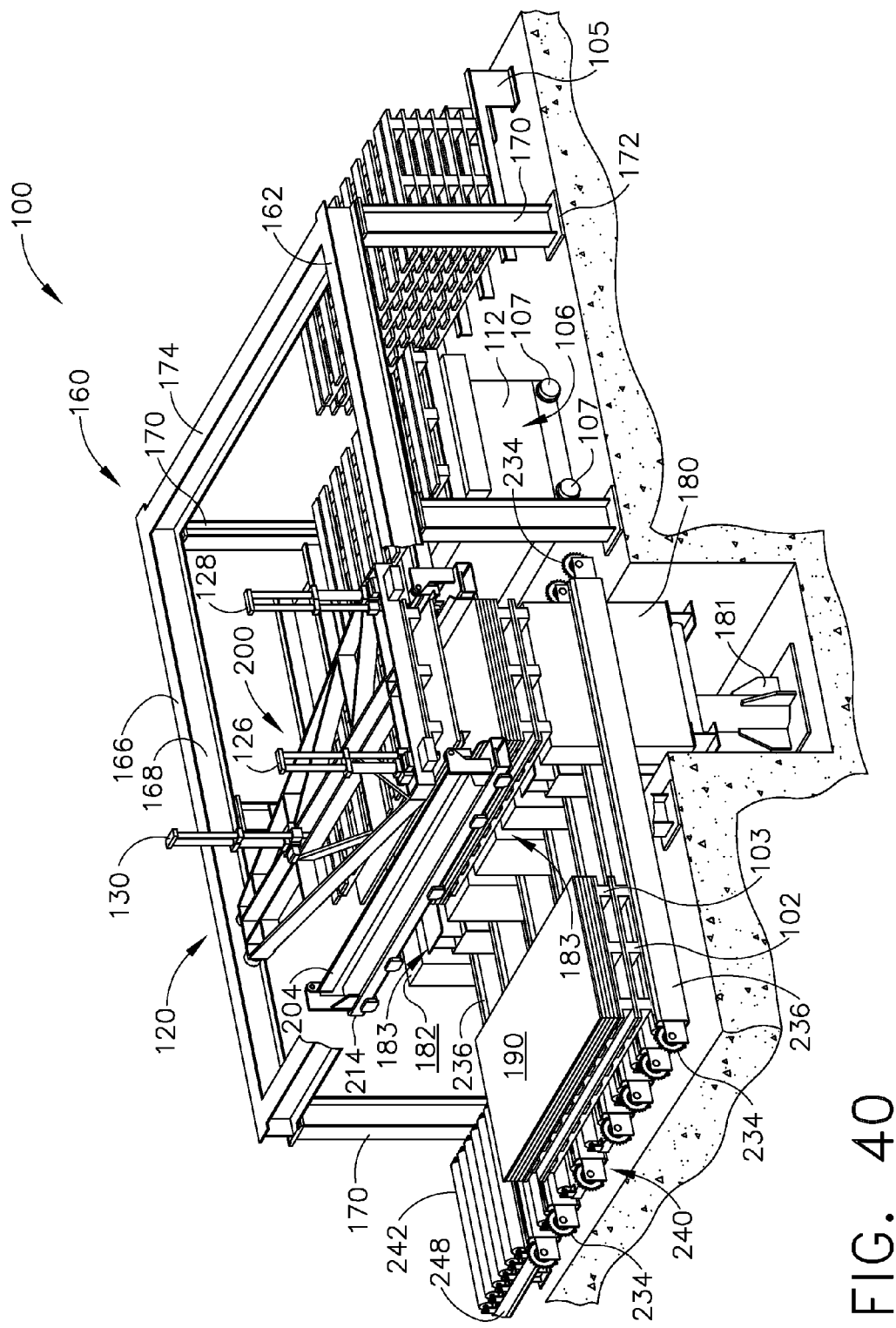
FIG. 40 is a perspective view of the system of FIG. 1 stacking pallets one another in accordance with the embodiment described in connection with FIG. 39.

In embodiments where first pallet 102 is not initially placed on elevator 180, the elevator 180 can be raised upwardly to support pallet 102 positioned on the extendable pallet supports. In various embodiments, referring to FIG. 25, elevator 180 can be raised upwardly such that pallet support surface 182 is positioned beneath pallet 102. In at least one such embodiment, elevator 180 can include one or more hydraulic and/or pneumatic lifts, such as lifts 181, for example, which can be configured to raise and lower pallet support surface 182. In any event, referring to FIG. 31, pallet support surface 182 can, in various embodiments, be positioned against at least a portion of pallet 102, for example, in order to at least partially support and/or raise pallet 102 off of the pallet supports. In at least one such embodiment, referring to FIG. 40, pallet support surface 182 can include one or more recesses 183 therein which can be configured to receive and accommodate pallet supports 220, for example, when they are in their extended position. In any event, once pallet 102 is at least partially supported by elevator 180, referring to FIG. 32, the extendable pallet supports can then be retracted such that pallet 102 is supported only by elevator 180. Once pallet 102 is supported by elevator 180, referring to FIGS. 26 and 27, elevator 180 can be indexed downwardly in order to control the distance in which the sheets of material 190 fall onto pallet 102, for example.

Figure 34:
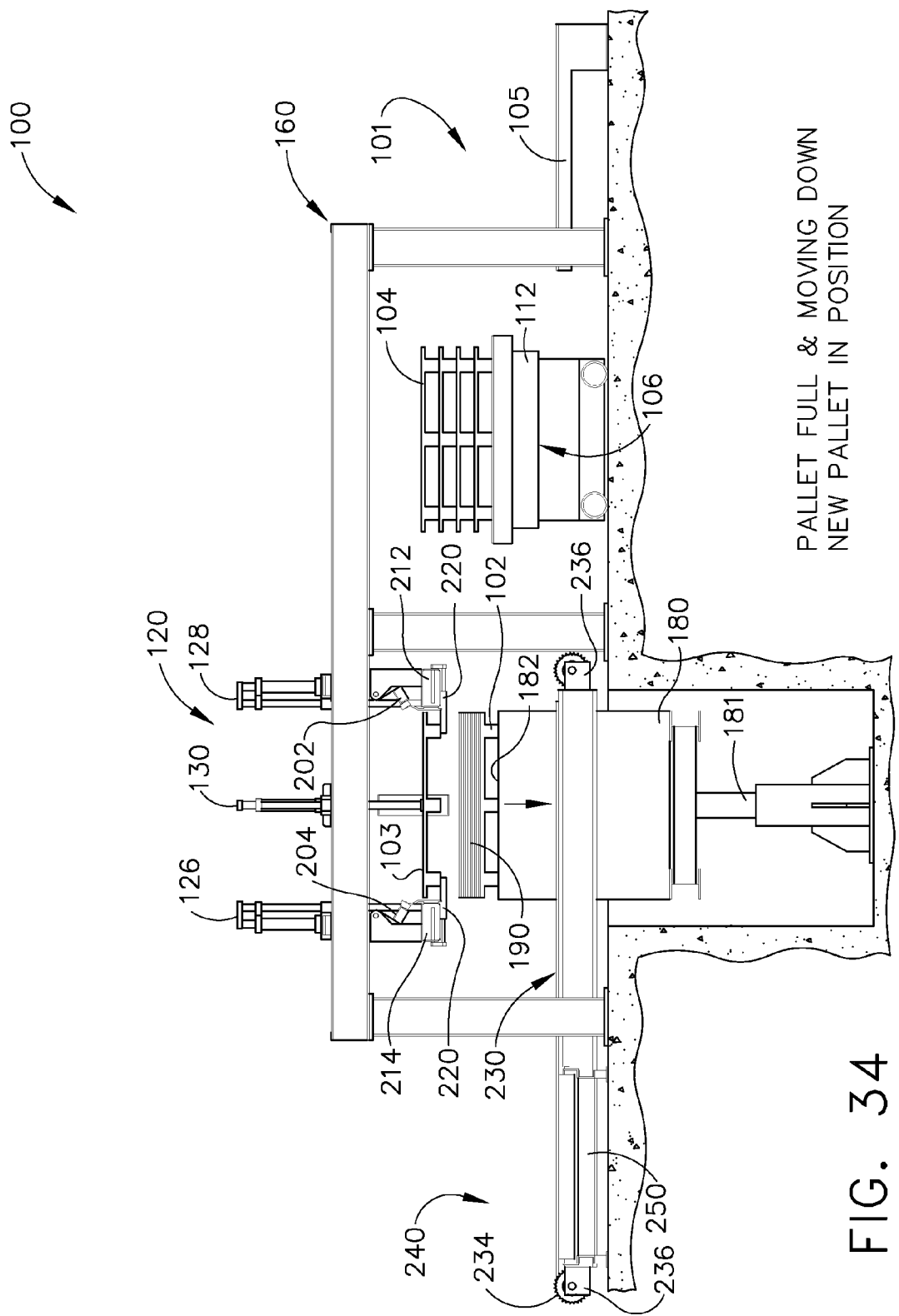
FIG. 34 is an elevational view of the system of FIG. 1 illustrating the first pallet being lowered by the elevator of FIG. 25 and illustrating the second pallet being placed on the extendable pallet supports of FIG. 18 by the pallet grasping assembly.
Figure 35:
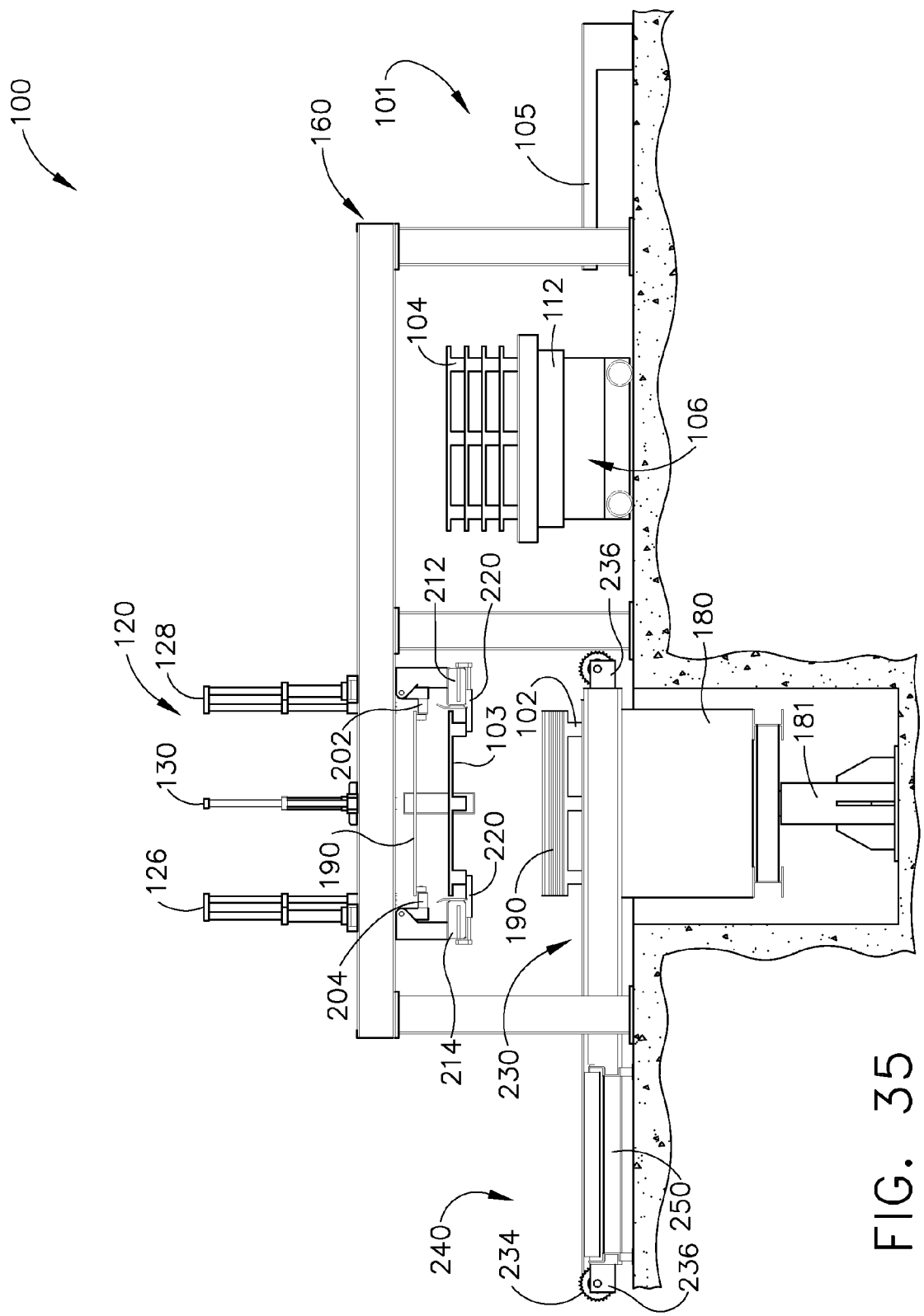
FIG. 35 is an elevational view of the system of FIG. 1 illustrating the first pallet positioned on a discharge conveyor and illustrating a sheet of material supported by the sheet supports of FIG. 18.

As outlined above, another pallet can be moved into a staging position above the first pallet as the sheets of material are being stacked on the first pallet. In various embodiments, referring to FIGS. 25-27, pallet grasping system 120 can be configured to grasp a second pallet, such as pallet 103, for example, and position pallet 103 above first pallet 102 as sheets of material are being stacked onto first pallet 102. In such embodiments, as described in greater detail further below, the first pallet 102 can be quickly replaced with the second pallet 103 with little, or no, interruption, to the material stacking process. As outlined above, the process of stacking or dropping sheets of material onto the first pallet can be repeated until a sufficient, or predetermined, quantity of sheets has been stacked on the first pallet. In various circumstances, a sufficient quantity of sheets can include a stack of sheets which is at or near the capacity that the pallet can support or, alternatively, a sufficient quantity of sheets can include a stack of sheets which is less than such capacity. In any event, once a sufficient, or predetermined, quantity of sheets has been placed onto first pallet 102, referring to FIG. 34, the elevator 180 can lower pallet 102 downwardly. In various embodiments, elevator 180 can lower pallet 102 such that pallet 102 and the sheets of material stacked thereon are positioned beneath sheet supports 202 and 204, for example. While the first pallet 102 is being lowered away from sheet supports 202 and 204, pallet grasping assembly 120 can lower second pallet 103 toward sheet supports 202 and 204. In various embodiments, extendable supports 220, for example, can be configured to support second pallet 103 while first pallet 102 is unloaded from elevator 180 and, simultaneously, while sheets of material are stacked on second pallet 103. Such a system can provide a significant advantage over other sheet stacking systems that must wait for a first, or full, pallet to be unloaded from the sheet stacking system before a second pallet can be positioned within the sheet stacking system to receive sheets of material thereon. Further to the above, various embodiments are envisioned in which the second pallet 103 can be lowered toward the first pallet 102 before the first pallet 102 is lowered by the elevator 180 such that the first pallet 102 can be immediately replaced by the second pallet 103 once the first pallet 102 is lowered.

Figure 36:
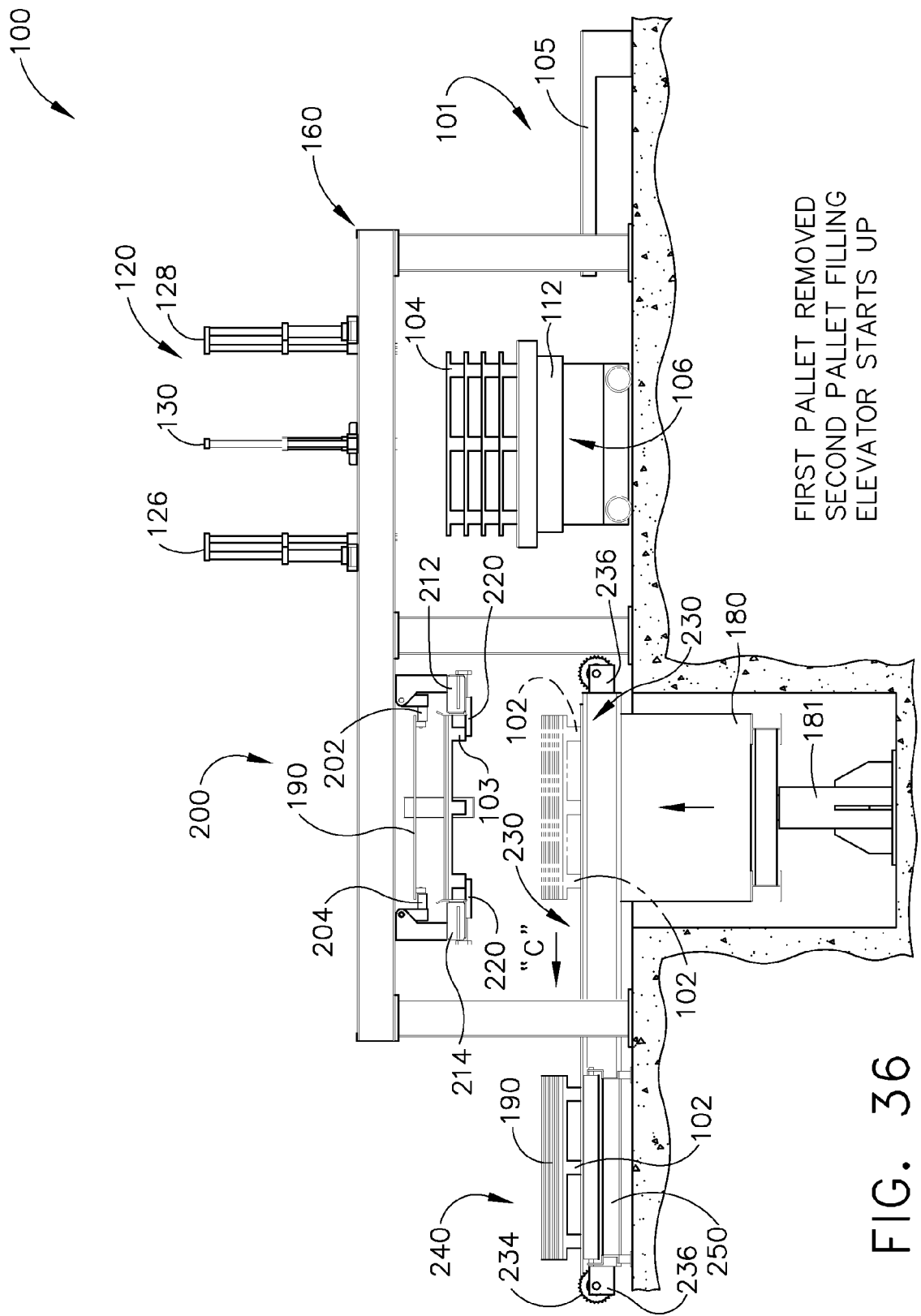
FIG. 36 is an elevational view of the system of FIG. 1 illustrating the first pallet being moved to a side conveyor, illustrating sheets of material being stacked on the second pallet, and illustrating the pallet grasping assembly en route to obtain a third pallet.

After the first pallet 102 has been lowered by the elevator 180 as described above, the first pallet 102 can be unloaded from the elevator 180 onto a conveyor. More particularly, referring to FIGS. 35-38, sheet stacking assembly 200 can further include discharge conveyor 230 which can be configured to move first pallet 102 off of elevator 180 after pallet support surface 182 of elevator 180 has been sufficiently lowered below the top surfaces of support beams 236. Stated another way, once pallet support surface 182 is moved below the top surfaces of support beams 236, the pallet 102 can be entirely supported on beams 236 and can be moved along beams 236 by one or more drive systems. In various embodiments, one or more of the beams 236 can include a drive system which can be configured to move pallet 102 along discharge conveyor 230 as illustrated in FIG. 36. Among other things, a drive system can include one or more drive belts, chains, and/or bands, for example, which can be configured to engage pallet 102 and slide it toward central conveyor 240. In certain embodiments, referring to FIG. 38, a beam 236 can include a chain drive mounted thereto comprising a drive chain 232, for example, which can be configured to pull pallet 102 off of elevator 180. In at least one such embodiment, one or more beams 236 can include one or more sprockets 234, for example, rotatably mounted to beams 236 which can define a path for drive chains 232. Support beams 236 can further include one or more motors (not illustrated) operably engaged with one or more of the sprockets 234 such that drive chains 232 can be driven around support beams 236. In at least one such embodiment, drive chains 232 can be pulled in a direction indicated by arrow C, for example. More particularly, when a pallet is positioned on beams 236 as outlined above, drive chains 232 can be positioned intermediate the pallet and beams 236 such that the drive chains 232 can move the pallet toward central conveyor 240. In various embodiments, referring to FIG. 38, the ends of beams 236, for example, can include inset portions 238 within which sprockets 234, for example, can be rotatably mounted to beams 236 such that sprockets 234 and/or chains 232 can be aligned, or at least substantially aligned, with the longitudinal axes of beams 236.

All the while the first pallet is unloaded from the sheet stacking assembly, further to the above, sheets of material can be stacked onto second pallet 103 as outlined above. Furthermore, sheets of material can continue to be stacked on second pallet 103 while the elevator 180 is positioned underneath second pallet 103 and, furthermore, when the extendable pallet supports 220 are retracted and the second pallet 103 is supported by elevator 180. Similar to the above, a third pallet 104 can be obtained by pallet grasping system 120, referring generally to FIG. 36, and positioned over the second pallet 103 in a staging position while the sheets of material are stacked onto the second pallet 103. Also similar to the above, once a sufficient, or predetermined, quantity of sheets have been stacked on the second pallet 103, the second pallet 103 can be lowered by elevator 180 and the third pallet 104 can be lowered to allow sheets of material to be stacked thereon. As before, such a system allows for a quick and efficient exchange of pallets wherein such a pallet exchange process can be repeated as many times as desired and/or possible.

In various embodiments, as described above, pallet grasping system 120 can be configured to move back and forth in order to obtain and deliver one pallet at a time. Although not illustrated, other alternative embodiments are envisioned in which a pallet grasping system can obtain more than one pallet at a time, hold the additional pallets above the sheet stacking assembly, and deliver them to the sheet stacking device when needed. In the various embodiments described herein, the pallet grasping system 120 is often described as holding one or more pallets 'above' the sheet stacking assembly and/or the sheet supports of the sheet stacking assembly, for example. While, in some embodiments, the term 'above' may describe a vertical position which is directly over the sheet stacking device and/or sheet supports, the term 'above' is also meant to include any suitable location in which and/or from which a pallet can be delivered downwardly to the sheet stacking device, for example. Furthermore, as outlined above, the devices and systems described herein can be utilized to stack sheets of material on "pallets; however any suitable platform, container, and/or any other suitable device for stacking material thereon are all considered to be encompassed by the term "pallet".

Figure 37:
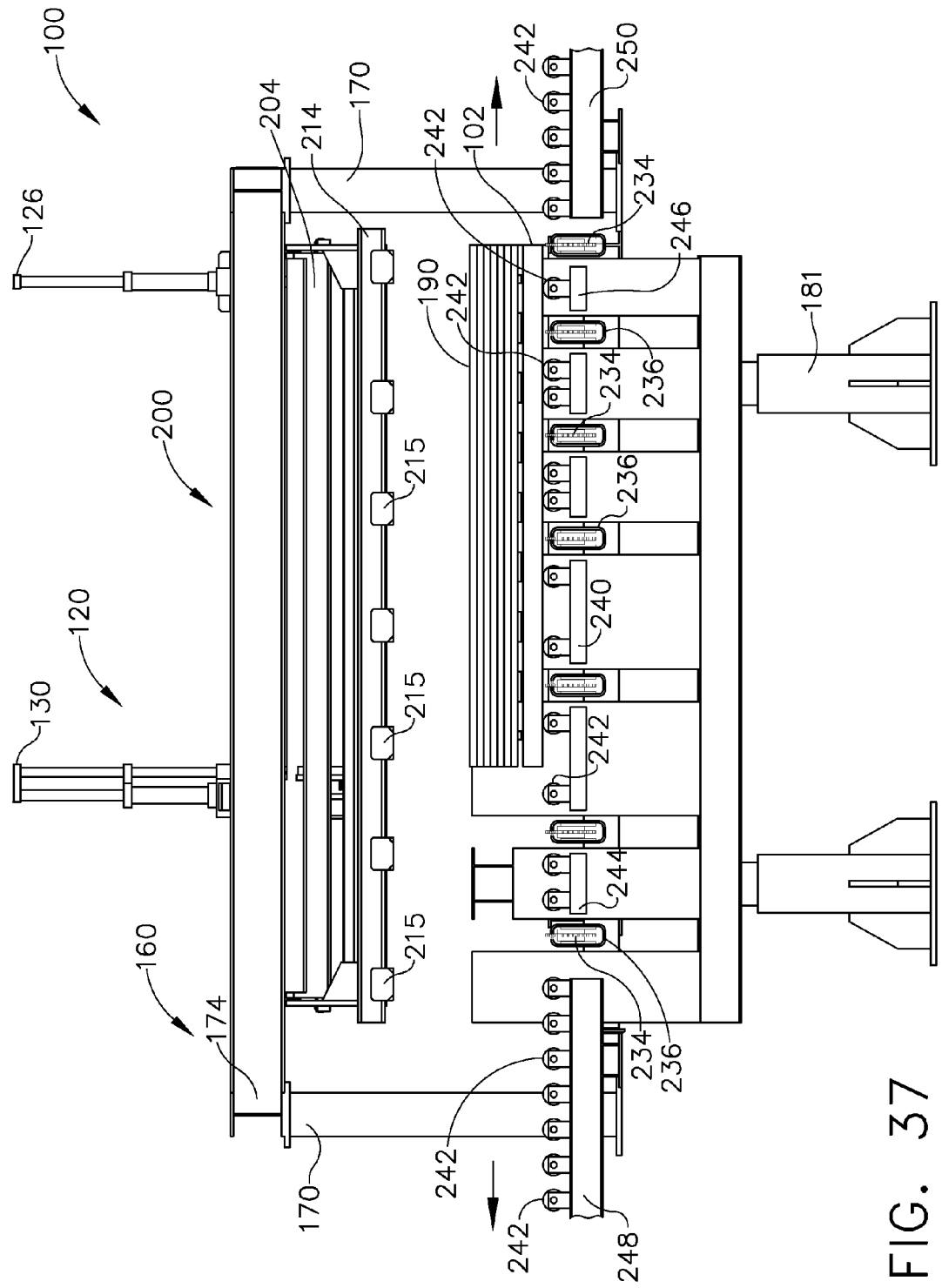
FIG. 37 is a side view of the system of FIG. 1 illustrating the first pallet on the side conveyor of FIG. 36.
Figure 38:
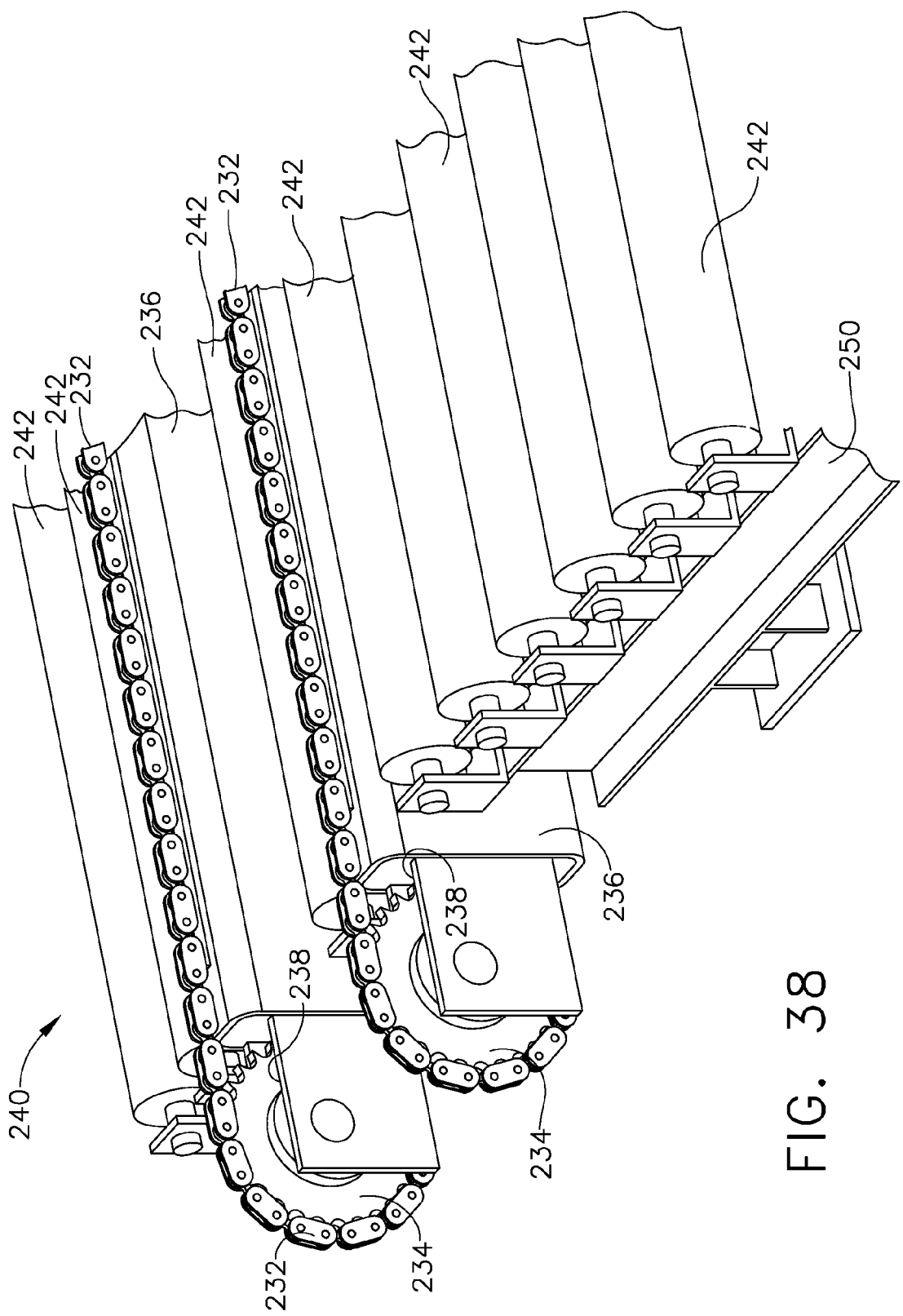
FIG. 38 is a partial detail view of a chain drive system of the discharge conveyor of FIG. 36.

In order to facilitate the unloading of stacked pallets from sheet stacking assembly 200, referring to FIG. 37, system 100 can further include one or more additional roller conveyors for storing, or at least temporarily supporting, one or more pallets before they are removed from system 100. In various embodiments, system 100 can further include a left roller conveyor 248 and a right roller conveyor 250 where pallets positioned on central conveyor 240 can be moved onto conveyors 248 and 250. In at least one embodiment, central conveyor 240 can include a first end 244, a second end 246, and one or more lifts, hoists, and/or any other suitable lifting devices (not illustrated) which can raise and/or lower ends 244 and 246. In at least one such embodiment, first end 244 can be raised above second end 246 such that a pallet on central conveyor 240 can slide toward and onto right roller conveyor 250. In certain embodiments, central conveyor 240 can include one or more roller supports 242 which can be configured to facilitate relative sliding movement between the pallet and central conveyor 240. In at least one embodiment, similar to the above, second end 246 can be raised above first end 244 such that a pallet on central conveyor 240 can slide toward and onto left roller conveyor 248. In various embodiments, both ends 244 and 246 can be raised, although one more than the other, in order to tilt central conveyor 240. In certain embodiments, one of ends 244 and 246 can be raised and the other of ends 244 and 246 can be lowered in order to tilt central conveyor 240. In at least one embodiment, both ends 244 and 246 can be lowered, although one more than the other. In any event, both conveyors 248 and 250 can include roller supports 242 which can facilitate the movement of a pallet from central conveyor 240 thereon.

Figure 39:
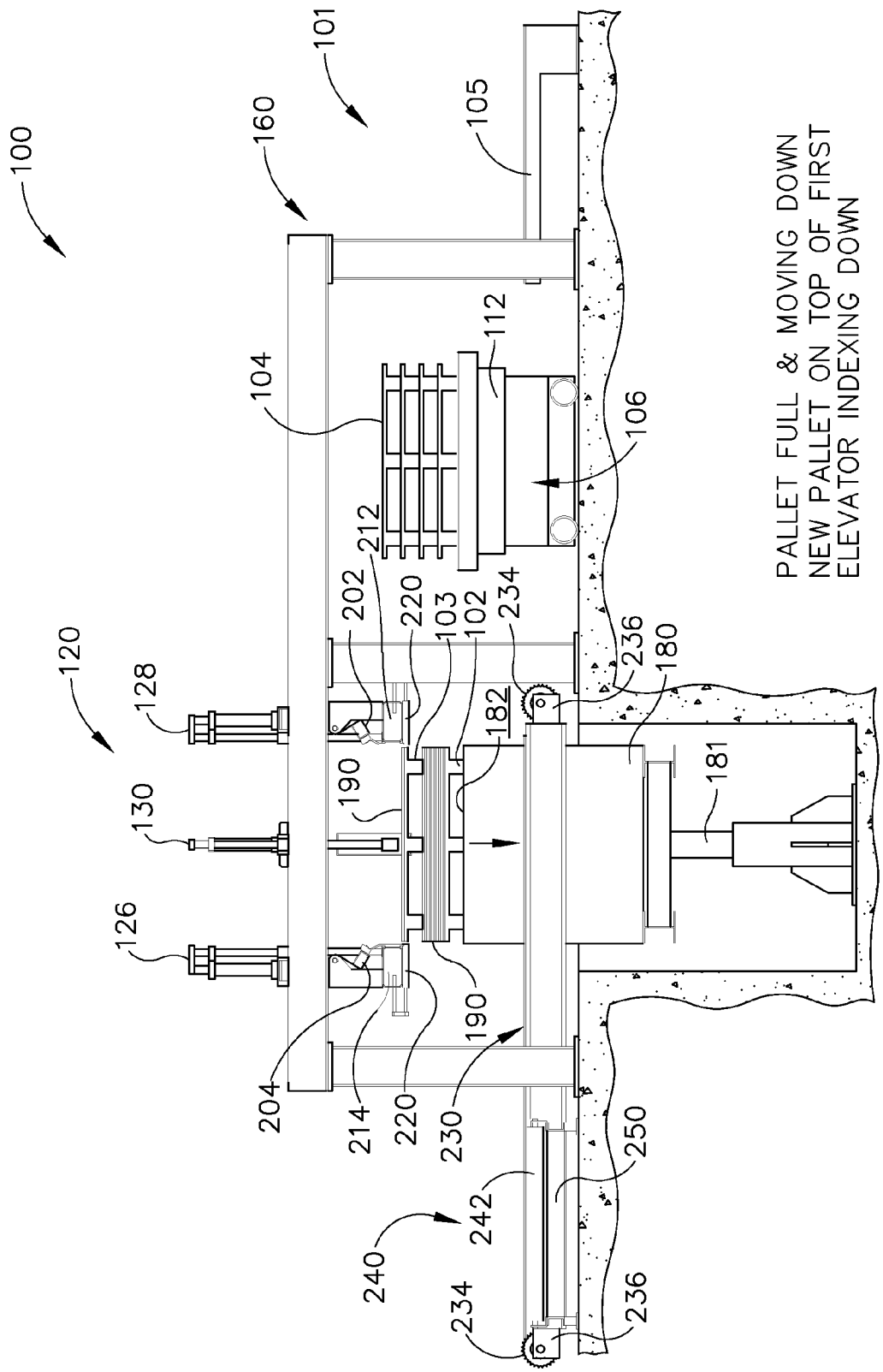
FIG. 39 is an elevational view of the system of FIG. 1 in accordance with an alternative embodiment of the present invention illustrating a second pallet supported by a first pallet and a stack of materials on the first pallet.

In various embodiments, as described above, a pallet having a sufficient, or predetermined, quantity of sheets thereon can be lowered by elevator 180, for example, and unloaded therefrom. In certain embodiments, however, a pallet, such as first pallet 102, for example, may be lowered by elevator 180 but may remain on elevator 180. In at least one embodiment, referring to FIG. 39, system 100 can be configured to position a second pallet, such as second pallet 103, for example, on top of first pallet 102. In at least one such embodiment, second pallet 103 may be positioned on top of the sheet stack supported by first pallet 102. In alternative embodiments, although not illustrated, the first and second pallets can be configured such that the second pallet is directly supported by the first pallet. Such embodiments can allow the pallets to be stacked on one another without contacting or disrupting the stack of materials. In any event, in at least one embodiment, one or more additional pallets may be stacked on the second pallet. In various embodiments, once a sufficient, or predetermined, quantity of sheets have been stacked on the pallets, and a sufficient, or predetermined, quantity of pallets has been stacked on one another, the elevator 180 can be unloaded. In at least one embodiment, referring to FIG. 40, for example, the stack of pallets can be unloaded from elevator 180 by discharge conveyor 230 in a suitable manner, including those described above, for example.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A sheet stacking system, comprising:
   a frame;
   an elevator having at least one pallet support surface configured to support a first pallet in an elevated position, wherein said elevator is movable along a vertical elevator axis;
   a sheet supplying system configured to supply sheets of material;
   a first sheet support configured to receive and support a first sheet of material from said sheet supplying system, wherein said first sheet support is rotatably mounted relative to said frame, and wherein said first sheet support is rotatable between a sheet-receiving position and a sheet-dropping position;
   a second sheet support configured to receive and support the first sheet of material, wherein said second sheet support is rotatably mounted relative to said frame, wherein said second sheet support is rotatable between a sheet-receiving position and a sheet-dropping position, wherein said first and second sheet supports are configured to receive a sheet of material from said sheet supplying system in a sheet supplying direction which is transverse to said vertical elevator axis, wherein said first and second sheet supports are configured to drop the first sheet of material onto the first pallet when said first and second sheet supports are rotated into their sheet-dropping positions, wherein said first and second sheet supports are configured to receive a second sheet of material from said sheet supplying system when said first and second sheet supports are rotated back into their sheet-receiving positions, and wherein said first and second sheet supports are configured to stack the second sheet of material onto the first sheet of material when said first and second sheet supports are rotated into their sheet-dropping positions once again;
   an opening defined between said first sheet support and said second sheet support when said first sheet support and said second sheet support are in said sheet-dropping positions, wherein said vertical elevator axis extends through said opening;
   a first extendable pallet support;
   a second extendable pallet support, wherein said first and second extendable pallet supports are configured to support the first pallet after they have been extended, and
   an independent pallet loading system, comprising:
      a guide;
      a grasping system configured to move along said guide, wherein said grasping system is configured to grasp the first pallet, and wherein said grasping system is configured to position the first pallet along said vertical elevator axis and over said opening; and
      a lowering system configured to lower the first pallet through said opening along said vertical elevator axis and onto at least one of said first extendable pallet support, said second extendable pallet support, and said elevator, wherein said grasping system is configured to release the first pallet and return upwardly away from said opening, and wherein said elevator is configured to move the first pallet between said elevated position and a lower position after a sufficient quantity of sheets of material have been stacked on the first pallet,
   wherein said grasping system is configured to operate independently of said elevator and said sheet supplying system and grasp a second pallet while sheets of material are being loaded onto the first pallet, and wherein said grasping system is configured to position the second pallet over said opening and the first pallet while sheets of material are being loaded onto the first pallet.

2. The sheet stacking system of claim 1, wherein said first and second extendable pallet supports are retractable, and wherein said elevator is configured to reposition said at least one pallet support surface beneath the second pallet in order to support the second pallet after said first and second extendable pallet supports have been retracted.

3. The sheet stacking system of claim 1, wherein said first and second extendable pallet supports are slidably mounted relative to said frame.

4. The sheet stacking system of claim 1, wherein said first and second extendable pallet supports are configured to be extended as said elevator is lowered from said elevated position.

5. The sheet stacking system of claim 1, wherein said first and second sheet supports are slidably mounted relative to said frame.

6. A method of stacking sheets of material, comprising:
positioning a first pallet on an elevator along a vertical axis;
stacking sheets of material on the first pallet in a direction which is transverse to said vertical axis;
obtaining a second pallet;
positioning the second pallet above the first pallet along said vertical axis while sheets of material are being loaded onto the first pallet, wherein said stacking step and said step of positioning the second pallet above the first pallet occurs concurrently and independently of one another;
lowering the first pallet along said vertical axis after a predetermined quantity of sheets have been stacked on the first pallet;
extending pallet supports for supporting the second pallet in a direction which is transverse to said vertical axis; and
lowering the second pallet onto the pallet supports along said vertical axis.

7. The method of claim 6, further comprising the steps of:
removing the first pallet from the elevator;
positioning the elevator beneath the second pallet; and
retracting the pallet supports such that the second pallet can be supported by the elevator.

8. The method of claim 7, further comprising the steps of:
stacking sheets of material on the second pallet;
positioning a third pallet above the second pallet while sheets of material are being stacked onto the second pallet;
lowering the second pallet after a predetermined quantity of sheets have been stacked on the second pallet;
extending the pallet supports for supporting the third pallet; and
lowering the third pallet onto the pallet supports.

9. The method of claim 7, further comprising the steps of:
positioning the elevator and the first pallet beneath the second pallet; and
retracting the pallet supports such that the second pallet can be supported by at least one of the first pallet and the sheets of material stacked on the first pallet.

10. The sheet stacking system of claim 1, wherein said first sheet support comprises a first array of rollers positioned along a first axis which is transverse to said vertical elevator axis, and wherein said second sheet support comprises a second array of rollers positioned along a second axis which is transverse to said vertical elevator axis.

11. The sheet stacking system of claim 1, further comprising a pallet loading assembly positionable vertically above said first sheet support and said second sheet support.

* * * * *